US010955803B1

(12) United States Patent
Kourliouros

(10) Patent No.: US 10,955,803 B1
(45) Date of Patent: Mar. 23, 2021

(54) SYSTEM AND METHOD FOR DOCUMENTING AND MANAGING EXECUTION OF PROCEDURES IN A GRAPHICAL INTERFACE ENVIRONMENT

(71) Applicant: NovaTech Process Solutions, LLC, Quakertown, PA (US)

(72) Inventor: Chris Kourliouros, Waynesboro, PA (US)

(73) Assignee: NOVATECH PROCESS SOLUTIONS, LLC, Quakertown, PA (US)

( * ) Notice: Subject to any disclaimer, the term of this patent is extended or adjusted under 35 U.S.C. 154(b) by 411 days.

(21) Appl. No.: 15/885,236

(22) Filed: Jan. 31, 2018

Related U.S. Application Data

(60) Provisional application No. 62/454,832, filed on Feb. 5, 2017.

(51) Int. Cl.
  *G05B 19/042* (2006.01)
  *G06F 8/34* (2018.01)
(52) U.S. Cl.
  CPC ........... *G05B 19/0426* (2013.01); *G06F 8/34* (2013.01); *G05B 2219/13144* (2013.01)

(58) Field of Classification Search
  CPC ....... G05B 19/0426; G06F 8/34; G06F 3/011; G06F 3/012; G06F 3/015
  See application file for complete search history.

(56) References Cited

U.S. PATENT DOCUMENTS

| | | | |
|---|---|---|---|
| 2006/0059460 A1* | 3/2006 | Phillips | G06Q 10/06316 717/109 |
| 2014/0330511 A1* | 11/2014 | Tison | G06K 9/00671 701/428 |
| 2015/0339453 A1* | 11/2015 | Richards | G16H 80/00 345/633 |
| 2017/0011254 A1* | 1/2017 | Guo | G06F 16/5838 |
| 2018/0225509 A1* | 8/2018 | Schmidt | G06K 9/00771 |

* cited by examiner

*Primary Examiner* — Brian W Wathen
(74) *Attorney, Agent, or Firm* — Miles & Stockbridge P.C.; David R. Schaffer

(57) ABSTRACT

Systems and Methods for Documenting and Managing Execution of Procedures in a Graphical Interface Environment, for example, in a Graphical User Interface (GUI), to control multiple, diverse systems. The presently disclosed subject matter relates generally to documenting procedures, and more particularly to graphically documenting and structuring the automated performance of and execution of the procedures to reduce human factor risks and accidents with improved connectivity between the systems running the procedures and the systems being controlled or monitored by the procedures.

36 Claims, 29 Drawing Sheets

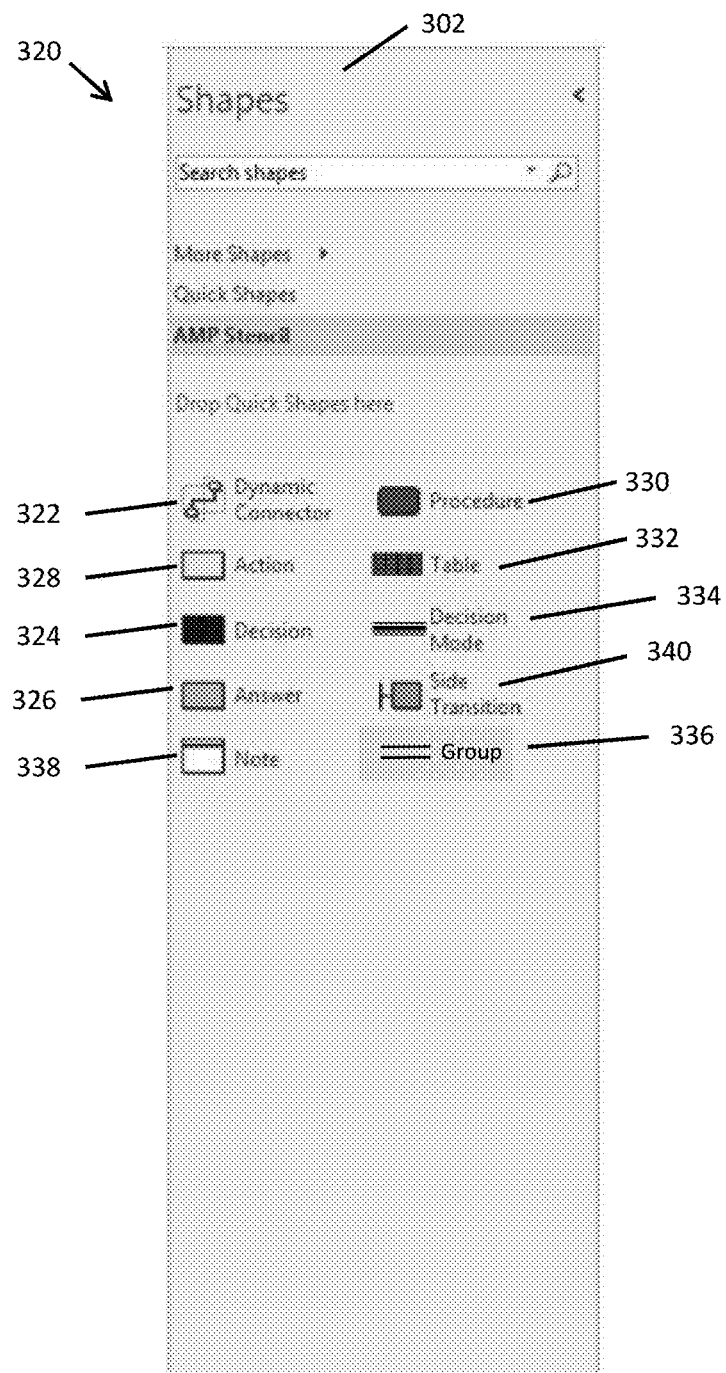

SYSTEM AND METHOD FOR DOCUMENTING AND MANAGING EXECUTION OF PROCEDURES IN A GRAPHICAL INTERFACE ENVIRONMENT

Systems and Methods for Documenting and Managing Execution of Procedures or, more specifically, Systems and Methods for Documenting and Managing Execution of Procedures in a Graphical Interface Environment, for example, in a Graphical User Interface (GUI), to control systems. The presently disclosed subject matter relates generally to documenting procedures, and more particularly to graphically documenting and structuring the automated performance of and execution of the procedures to reduce human factor risks and accidents with improved connectivity between the systems running the procedures and the systems being controlled or monitored by the procedures.

BACKGROUND

Twenty years ago, the US Occupational Safety and Health Administration (OSHA) issued its Process Safety Management (PSM) of Highly Hazardous Chemicals standard. The objective was to spell out the requirements for preventing or minimizing the consequences of catastrophic releases of toxic, reactive, flammable, or explosive chemicals that could result in toxic, fire, or explosion hazards.

Recent analysis of abnormal events in the process industry by both the AIChE—Center for Chemical Safety and the US Chemical Safety Board indicates that, though major progress has been made, the improvement trajectory seems to have plateaued. Most companies affected by the regulation have deployed a combination of solutions involving human behavior management, equipment safety systems, and more extensive operating procedures.

Not only have improvements in avoiding abnormal events tapered off, a deeper investigation reveals that the severity of these less-frequent incidents is climbing at a disturbing and surprising rate from the perspective of injury, illness, environmental exposure, and property damage. This raises the questions: "What is different?" and "Have the failure mechanisms that initiate abnormal events changed?" The most recent investments in technology, training, and enforcement have not succeeded in eliminating the root causes of these complex events.

Automation to reduce or eliminate human error is old news. The challenge is that current levels of automated manufacturing processes are allowing improper actions to slip through the cracks. Seventy-five percent (75%) of these accidents are due to human error in execution of non-automated tasks as either a primary or a secondary contributing cause, which result in injury, illness, death, quality, and productivity problems. The barrier to implementing higher levels of automation are a) component diversity in the field b) cost of adding more instrumentation, wiring and electronic infrastructure, c) humans still need to be part of the decision making process to some degree depending on the hazard, time of response required and probable frequency of abnormal occurrences. The breakthrough in human performance will not be in the elimination of humans, it will be in the computer augmentation of human manual tasks.

BRIEF DESCRIPTION OF THE DRAWINGS

Non-limiting and non-exhaustive embodiments of the disclosed subject matter are described with reference to the following figures, wherein like reference numerals and/or indicia refer to like parts throughout the various views unless otherwise precisely specified.

In the following drawings, like reference numerals generally indicate identical, functionally similar, and/or structurally similar elements. The left most digits in the corresponding reference numeral indicate the drawing in which an element first appears.

FIG. 3A depicts an exemplary embodiment of a screenshot of an exemplary set of graphical building components that may be used in an exemplary graphical user interface (GUI) environment including a system for documenting a procedure graphically according to an exemplary embodiment of the disclosed subject matter;

DETAILED DESCRIPTION

In general, one or more embodiments of the disclosed subject matter can include (i.e., comprise) a networked computer system and a computer-implemented method for managing a process that includes the steps of: (a) receiving the process by receiving input of visual operation information in a graphical visual procedure interface format, and receiving a free form text description; (b) converting the visual operation information from said graphical visual procedure interface format and said free form text description to a data container language format; (c) converting data in the data container language format to a computer function language format, sending the data in the computer function language format to interpreters for multiple real-time feedback control units, and allowing the interpreters to automatically execute the process represented by the data, and including an alarm response routine with a visual and/or an audio operation and warning information, the alarm response routine in the computer function language format is capable of causing interactive display of a step or steps of a procedure in the process in response to an alarm condition; and the multiple real-time feedback control units use information of the physical state of a system, a piece of equipment, a chemical or a material on which the process acts or transforms (it is noted that the real-time feedback of a manually executed tasks is consumed by a process control computer to interlock a set of automated actions to inhibited improper manual execution which may be unsafe or result in an adverse consequence); (d) displaying information from the data in the data container language format in a procedure overview display; and (e) allowing an operator to update the data in the data container language format, generating an image document in a secure format from the updated data in the data container language format, and electronically filing the image document in a secure format with a regulatory organization.

This application claims benefit of priority to U.S. Provisional Patent Application Ser. No. 62/454,832 filed on Feb. 5, 2017, which is hereby incorporated by reference in its entirety herein.

Benefits of the new system design include platform and proprietary computer language independence (e.g., but not limited to, use of the OPC specification and the LUA programming language to implement the software on a server and/or computer, as opposed to the existing implementations using proprietary code and programmable logic controllers (PLCs), the ability to send, receive, process and initiate actions in response to images and/or actions manually performed by an operator to insure the safe and proper performance of the procedure.

Figure 8:
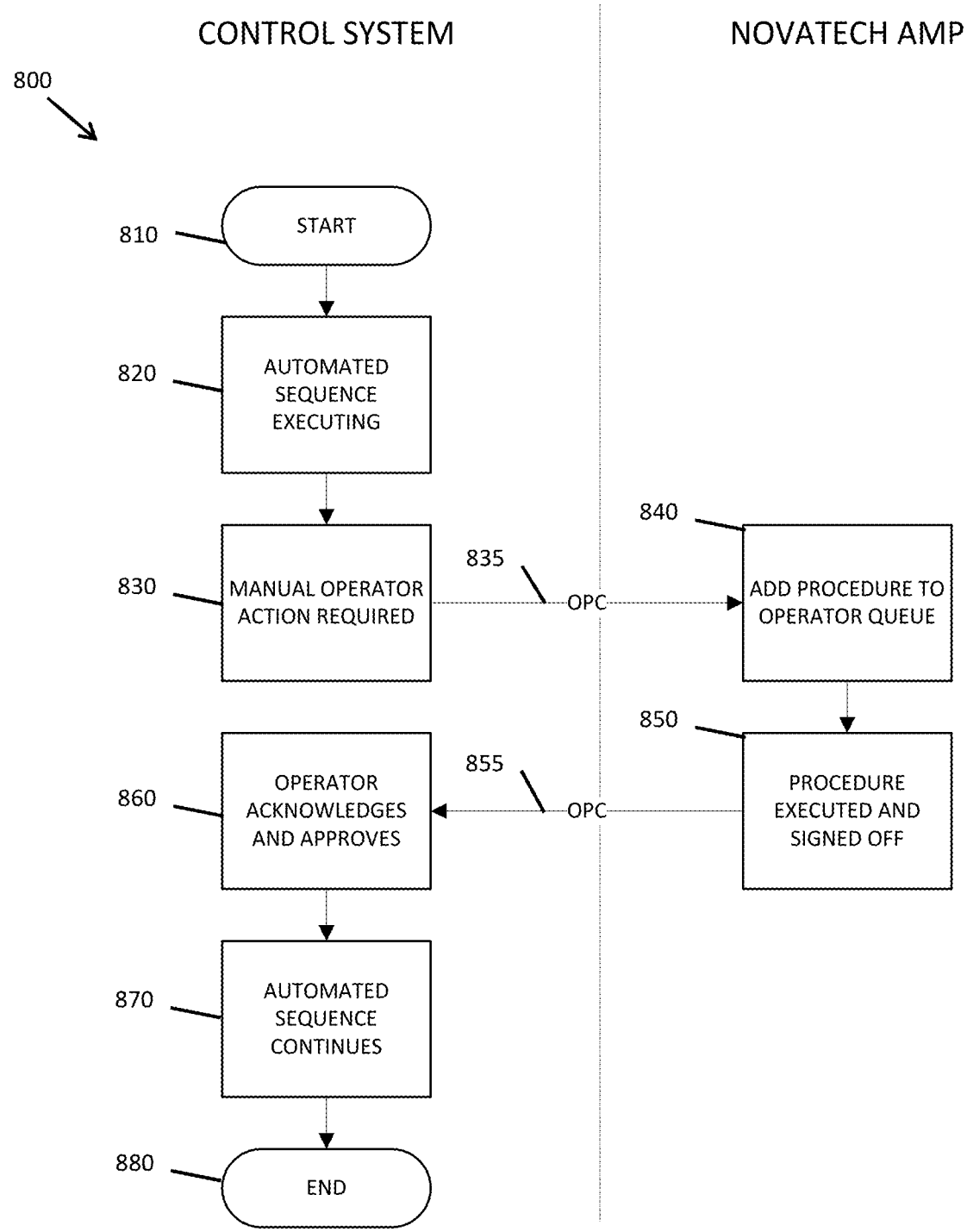
FIG. 8 is a flowchart of an execution flow showing the real-time interlocking functionality between a control system on which a procedure is executing and an exemplary embodiment of the disclosed subject matter in which a manual operator input is required.
Figure 9:
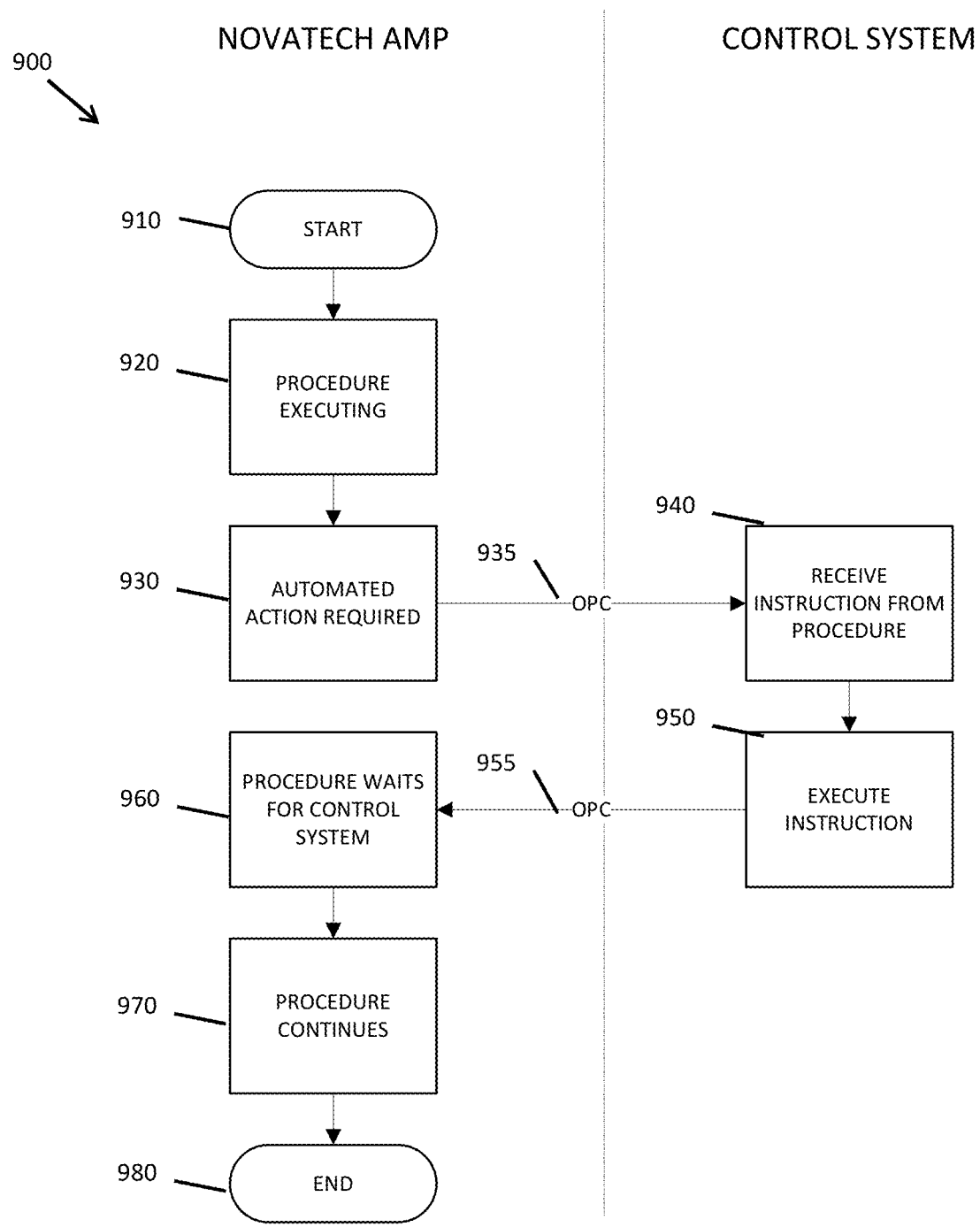
FIG. 9 is a flowchart of an execution flow showing the real-time interlocking functionality between an exemplary embodiment of the disclosed subject matter on which a procedure is executing and a control system from which an automated instruction execution is required.

In general, for the new augmented manual procedure product, the improvements are in universal connectivity to third party control systems other than just proprietary control systems, e.g., but not limited to, NovaTech® D/3®, other non-control system resources, e.g., but not limited to, plant databases such as MES, ERP, LAB and HISTORIAN databases and systems as well as open APIs, and enhanced interlocking or error proofing of human cognitive decision making and subsequent manual actions taken to computer verify correctness and provide second level approval of these actions prior to moving forward in the manufacturing process (see, FIGS. 8 and 9). Also mobility of the application is enhanced by integrating the procedure application such as, a smart phone, tablets, optical head-mounted displays, such as wearable eyeglasses (e.g., but not limited to, HoloLens™ by Microsoft), visors and/or helmets, smart watches, interactive audio devices (e.g., but not limited to, Amazon Alexa™, Apple HomePod™ and Google Home™), as well as commercial automation systems through, for example, but not limited to, secure wireless, cellular communications, Bluetooth, and WIFI. A key to the embodiments of the disclosed subject matter is their platform neutral integration of speech, visual and manual actions with automated control schema that are enabled for mobile implementation and use.

Currently, in the existing Paperless Procedures (PLP) system, which, unlike other similar solutions, the competing user interface formats are graphical flowcharts that are engineering centric and not operator centric. Applicant's prior PLP system is described in U.S. Pat. No. 7,590,942, which is hereby incorporated by reference in its entirety herein. Operators prefer checklists derived from written and approved standard operating procedures. The challenge however is that these procedures are quite lengthy in content and it is not practical to carry and use in the field (e.g., historically, a clipboard). The result is the operator carries un-validated or approved crib notes in their portable "little black books".

A shortcoming of existing systems is the lack of the ability to deploy written and concise procedures to mobile devices, for example, but not limited to, smart phones/PDAs, tablets or wearable eye glasses. What if the information provided to these mobile devices is structured in digestible chunks that when completed the actions are visually and or audibly confirmed and transmitted back to a platform neutral control system. Additionally, the equipment/system to be worked on and the manual actions that are performed can be visually recorded via cameras on board these mobile devices to confirm the device ID, location, orientation and status before and after the manual task can be completed using, for example, but not limited to, fiducial markers, as well as RFID, Bluetooth, NFC and other connected proximity sensors. A fiducial marker or a fiducial is an object placed in the field of view of an imaging system that appears in the image produced, for use as a point of reference or a measure. For example, they are used to guide computer robots during surgery such as removal of prostate cancer. h may be either something placed into on or an overlay over (for example, but not limited to 3D models) the imaging subject, or a mark or set of marks in the reticle of an optical instrument to illustrate alternative markers of device orientation or positioning.

In addition, the ability to "see" the fiducial markers through the mobile devices enables the system to be able to send a visual instruction, for example, but not limited to, an overlay image, video clip and/or 3D image projected on top of an image of reality that shows the action needed to be taken based on the position of the marker on the display of the user. For example, but not limited to, in a step related to opening a closed valve, if the valve is seen as being in a closed position in a picture or video that can be sent from the user's mobile device, then an image or video can be sent back to the mobile device and overlaid on the screen to illustrate in which direction to move the valve handle or in which direction to turn the valve wheel to open the valve. Alternatively, if the valve is seen as already being in an open position, a "Completed" notice or "Take No Action" warning image can be sent to the user with the mobile device. This provides the additional benefit of helping to prevent errors during the performance of the tasks. These visual instructions can be created and associated with each step during the initial creation of the procedures or following the creation of the procedures, see for example, FIG. 1A. In addition to the text and image messages, audio messages can also be sent, either separately or in combination with one or more text or image messages. The key here is the field operator's acknowledgement of completion of a task. Acknowledgement can be, for example, but not limited to, by making a key stroke, an audible command (like Siri) or a hand motion such as air clicking.

The result of an augmented manual procedures (AMP) system integrating both manual and automated tasks into a fully integrated Man-Machine-Methods controls environment is a more deterministic and predictable execution of manual tasks by reducing human factors variability in execution of the tasks. Another result is lowering the economic barriers of adding higher levels of procedural automation by reducing the amount of electronic hardware required to detect, act, confirm and record actions. This makes the implementation very affordable and practical from an enforcement of standard solutions perspective (e.g., but not limited to, by OSHA and other government regulators).

Figure 1A:
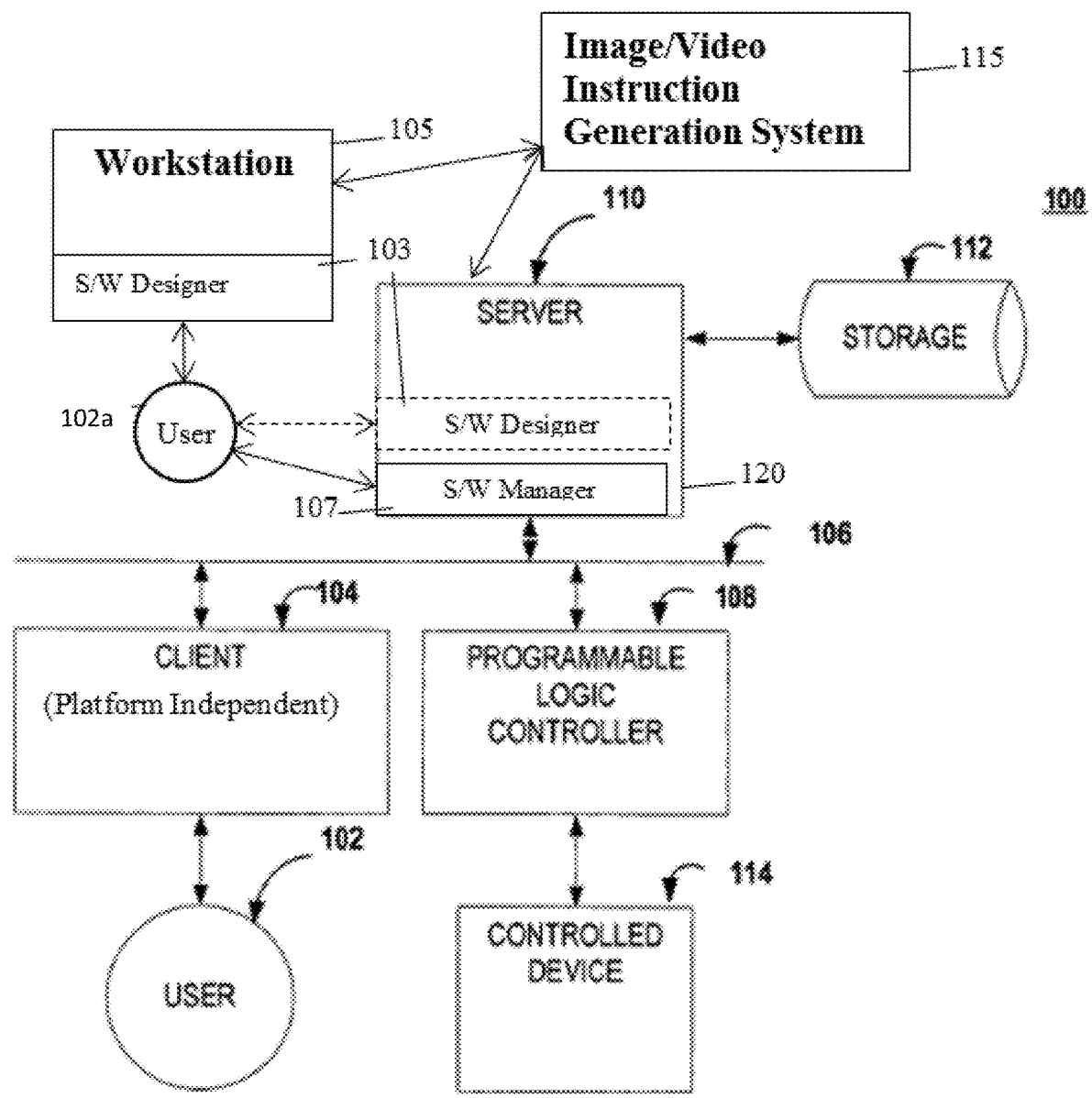
FIG. 1A depicts an exemplary embodiment of a system environment for managing a procedure according to an exemplary embodiment of the disclosed subject matter.

FIG. 1A depicts an exemplary system 100 for managing a procedure that may include a client 104 that may be used by a user 102 to document a procedure according to an exemplary embodiment of the disclosed subject matter. Client 104 may be a standalone computing device in one exemplary embodiment, which can be platform independent. In another exemplary embodiment, client 104 may be coupled as shown to other devices to achieve the system 100. Client 104 in an exemplary embodiment may be a computer such as illustrated and described further below with reference to FIG. 4. As shown in FIG. 1A, client 104, in another exemplary embodiment, may also be a component of a network system. In one exemplary embodiment, client 104 may be part of a client-server system. System 100 includes client 104 coupled to another device, such as, e.g., but not limited to, server 110. In an exemplary embodiment, client 104 may be coupled over a network 106, which may include one or more communication links and associated network hardware. For example, but not limited to, network 106 may include an exemplary wireless or wired network communication link. Server 110 may in an exemplary embodiment be used by client 104 to access resources of server 110 such as, e.g., but not limited to, a storage device 112, a software designer program 103 and a software manager program 107. Server 110 may include the software designer program 103 and the software manager program 107, both of which can be directly accessed by the client 104 and a user 102. Alternatively, another user 102a can be connected to a workstation 105 in which a copy of the software designer program 103 is stored and is directly accessible by user 102a. An image/video instruction generation system 115 can be directly connected to and in two-way communication with the server 110 and the workstation 105 to provide image and video inputs. Server 110 may be a general purpose computing device as described further below with reference to FIG. 4. In an exemplary embodiment, the client 104 may be further coupled as shown in system 100 to another device such as, e.g., but not limited to, a programmable logic controller (PLC) 108. The PLC 108, in an exemplary embodiment, may be used to control another controllable device such as, e.g., but not limited to, controlled device 114. In an exemplary embodiment, the client 104 may communicate with other networked devices such as, e.g., but not limited to, server 110, and/or PLC 108 using any of a number of well-known communication protocols, networks and related technologies such as, e.g., but not limited to, a local area network (LAN), a wide area network (WAN), a wired network, or a wireless network. Although client 104, server 110, and PLC 108 may be described herein as coupled to one another, the devices 104, 108, and 110 need not be directly connected to one another, and may instead by coupled by any of various conventional physical or logical, network technologies such as, e.g., but not limited to, routers, bridges, gateways, transceivers, antennae and cables. In other words, coupled here means that they are in communication with each other.

The client 104 and the workstation 105 may be a communications device or computing device such as, e.g., but not limited to, a tablet, handheld, subnotebook, notebook, laptop, desktop or work station computer such as, e.g., but not limited to, a personal computer (PC), a personal digital assistant (PDA), cellular phone or other personal communication device.

Figure 1B:
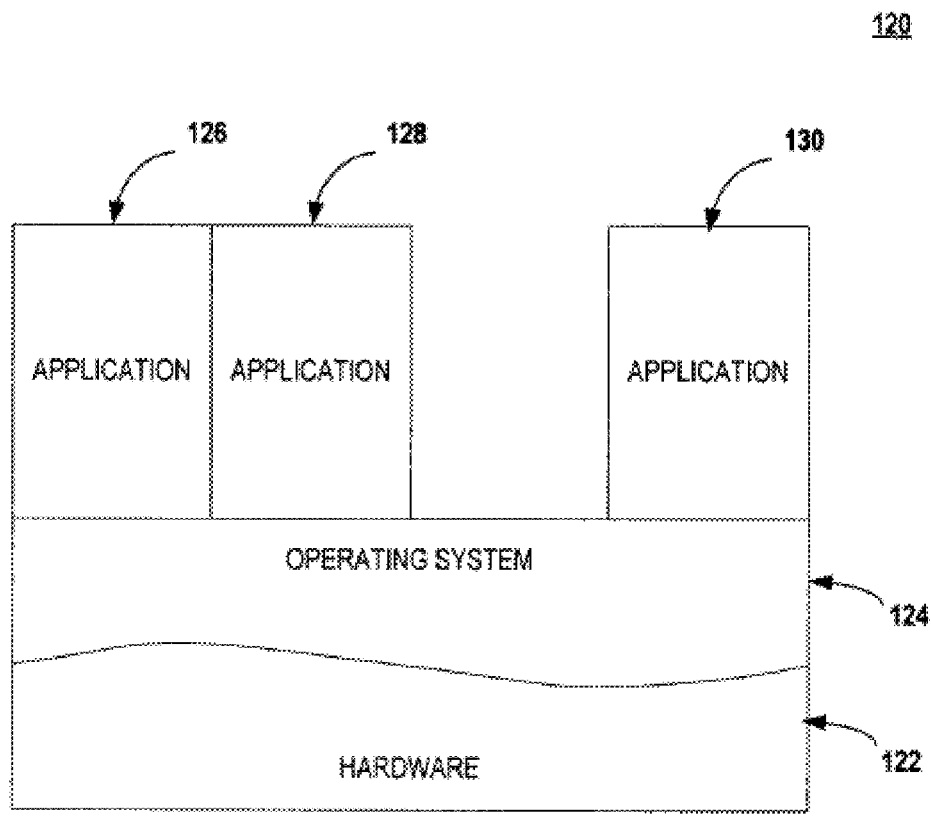
FIG. 1B depicts an exemplary embodiment of a software application architecture environment according to an exemplary embodiment of the disclosed subject matter.

FIG. 1B depicts an exemplary embodiment of a software application architecture environment 120 according to an exemplary embodiment of the disclosed subject matter. Exemplary software architecture environment 120 as illustrated may include, e.g., but is not limited to, a hardware platform 122 upon which may execute an operating system 124. Operating system 124 may provide a standard software interface including, e.g., but not limited to, a graphical user interface (GUI) through which the user 102 may interact with the operating system 124 and/or one or more software application programs 126, 128, and 130 as illustrated. It would be apparent to a person having skill in the art that environment 120 could also depict, e.g., but not limited to, client 104, server 110, and PLC 108. Operating system 124 may provide a uniform interface of application programming interfaces (APIs) to applications 126, 128 and 130 for access to hardware 122. An exemplary application 126 may include a graphical drawing or flowcharting application program such as, e.g., but not limited to, VISIO® available from Microsoft Corporation of Redmond, Wash., U.S.A.

Figure 1C:
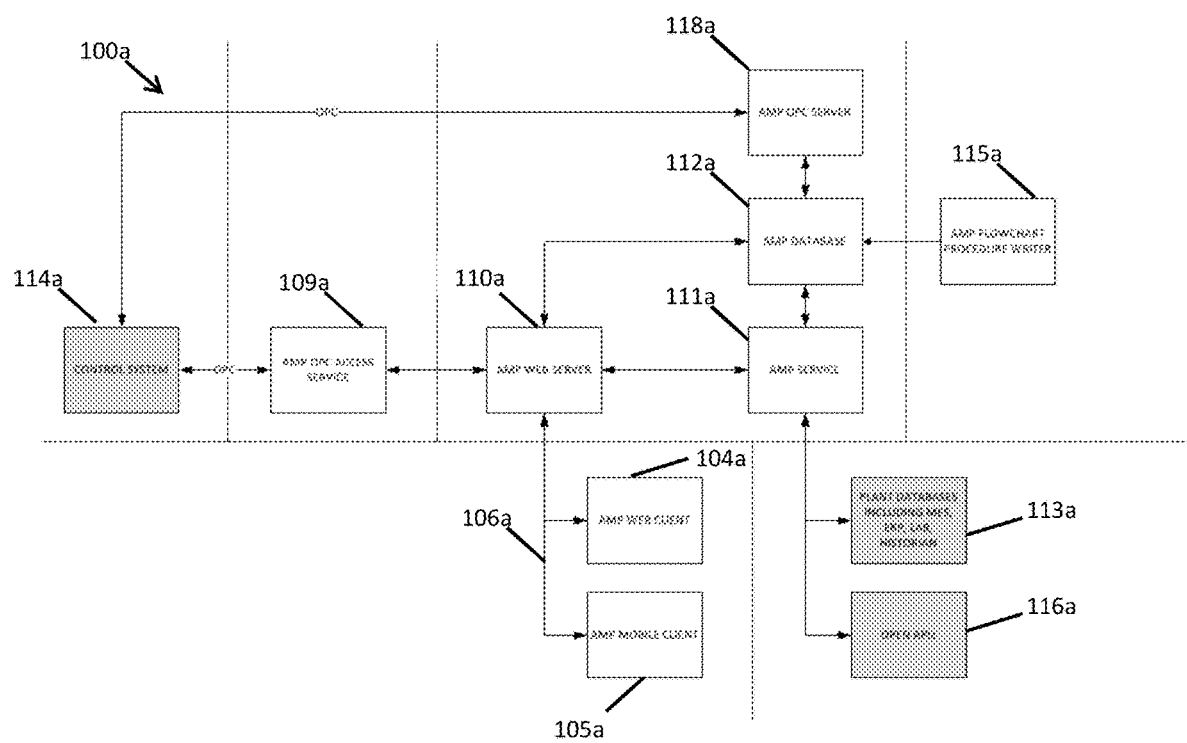
FIG. 1C depicts a diagram 100a illustrating another exemplary system for managing a procedure that includes a web server 110a coupled to a web client 104a and a mobile client 105a and be used to run a procedure according to an exemplary embodiment of the disclosed subject matter.

FIG. 1C depicts an exemplary embodiment of a system 100a illustrating another exemplary system 100a for managing a procedure that includes a web server 110a coupled to a web client 104a and a mobile client 105a and either can be used to run the procedure according to an exemplary embodiment of the disclosed subject matter. In FIG. 1C, the web server 100a is further coupled to a database 112a in which the procedures created to run processes can be stored for access for execution as well as initial creation and editing. Web client 104a may be a standalone computing device in one exemplary embodiment, which can be platform independent. Web client 104a in an exemplary embodiment may be a computer such as illustrated and described further below with reference to FIG. 4. As shown in FIG. 1A, web client 104a, in another exemplary embodiment, may also be a component of a network system. In one exemplary embodiment, web client 104a may be part of a client-server system with the web server 110a. In an exemplary embodiment, web client 104a may be coupled over a network 106a, which may include one or more communication links and associated network hardware. For example, but not limited to, network 106a may include an exemplary wireless or wired network communication link. Web server 110a may, in an exemplary embodiment, be used by web client 104a to access resources of web server 110a such as, e.g., but not limited to, a database 112a either directly through the web server 110a or through the web server 110a and a service component 111a. The web server 110a may also be used to access an OPC access service component 109a coupled to and in communication with one or more control systems 114a via an OPC connection and the OPC access service component 109a is coupled to and in communication with an OPC server 118a, which is in turn is coupled to and in communication with the database 112a. In FIG. 1C, the control systems 114a can include a stand-alone control system as well as a PLC and a control system, similar to the PLC 108 and the control system 114 of FIG. 1C. In FIG. 1C, web server 110a may include a software designer program and a software manager program, both of which can be directly accessed by the web client 104a. Alternatively or in addition to the web server 110a, a flowchart procedure writer 115a can also include the software designer program and the software manager program. In addition, the service component 111a is coupled to multiple plant databases 113a and open APIs to exchange data via a communications channel 117a, which can be implemented using Lua created functions. For example, some of the data sources that are supported include, for example, but are not limited to, Microsoft® SQL, Microsoft® Open Database Connectivity (ODBC) and OSIsoft PI historian. The use of this structure with both OPC and Lua communications enables executing procedures to exchange data between all five (5) levels of the Purdue Reference Model Architecture (PERA), i.e., levels 0-4, which is a reference model for an enterprise architecture for use with computer integrated manufacturing.

In an exemplary embodiment, the web client 104a may communicate with other networked devices such as, e.g., but not limited to, the web server 110a, and/or the control system 114a using any of a number of well-known communication protocols, networks and related technologies such as, e.g., but not limited to, a local area network (LAN), a wide area network (WAN), a wired network, or a wireless network. Although the web client 104a, the web server 110a, and the control system 114a may be described herein as coupled to one another, the web client 104a, the web server 110a, and the control system 114a need not be directly connected to one another, and may instead by coupled by any of various conventional physical or logical, network technologies such as, e.g., but not limited to, routers, bridges, gateways, transceivers, antennae and cables. In other words, coupled here means that they are in communication with each other.

The web client 104a and the mobile client 105a may be a communications device or computing device such as, e.g., but not limited to, a tablet, handheld, subnotebook, notebook, laptop, desktop or work station computer such as, e.g., but not limited to, a personal computer (PC), a personal digital assistant (PDA), or other device.

Figure 2A:
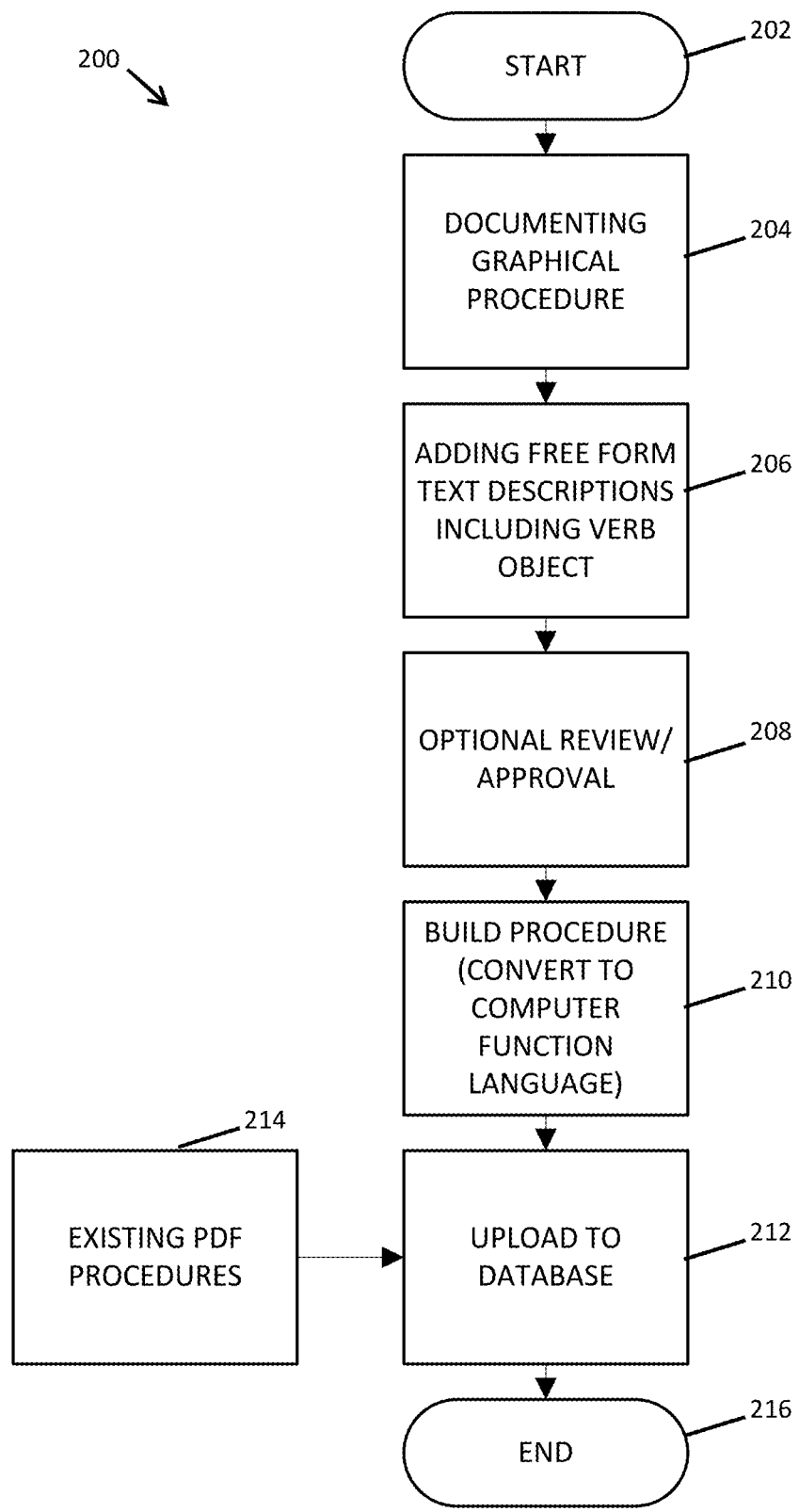
FIG. 2A depicts an exemplary embodiment of a flow diagram illustrating an exemplary process of documenting and creating a procedure for a process that may include manual, computer assisted and automatic execution, interactive display, and storage in alterable and/or unalterable format of a procedure execution according to an exemplary embodiment of the disclosed subject matter.

FIG. 2A depicts an exemplary embodiment of a flow diagram illustrating an exemplary process of documenting and creating a procedure for a process that may include manual, computer assisted and automatic execution, interactive display, and storage in alterable and/or unalterable format of a procedure execution according to an exemplary embodiment of the disclosed subject matter. Processes that can be managed include, for example, but not limited to, a chemical process, a material handling process, a drug manufacturing process, a health services process, an emergency response process, a military operation, a military service process, an electrical generation process and/or an electrical distribution process, etc. The process may include, e.g., but not limited to, a real process, for example, but not limited to, a process in a manufacturing plant, or a simulated process, etc. A simulated process may be developed to mimic an actual process and allow, for example, but not limited to, a user such as an operator to be trained without risk of damage to equipment or harm to personnel. A simulated process may range from simple to complex; for example, but not limited to, a simple simulated process may allow a user to step through individual steps of a process with no resultant action. A complex simulated process may allow a user to advance to a step, provide the user with a simulated malfunction, and allow the user to enter a response to the simulated malfunction. In an exemplary embodiment, the user 102 may use the system to document a procedure for managing a process using an interactive graphical user interface (GUI) as illustrated and discussed further below with reference to FIGS. 3A and 3B. Once a procedure is documented, in an exemplary embodiment, the procedure may be executed in a manual environment with an operator manually stepping through the procedure, or automatically while allowing the user 102 to track the status of execution. User 102 may in an exemplary embodiment, view execution of the procedure using an interactive display. The execution of the procedure may be logged and stored in an alterable file format and/or an unalterable file format, which may, in an exemplary embodiment, include timestamps of when steps of a procedure are performed, tracking of authentications of steps requiring such, as well as operator comments from user 102.

An advantage of a system, method, and computer program product according to the disclosed subject matter is that the tools for designing a procedure can be used by technicians or office workers having a minimum of engineering or scientific training. With a system, method, and computer program product according to the disclosed subject matter, an engineer can provide a description of a procedure to a technician or office worker who then can use a graphical interface to enter the described procedure into a system, so that the procedure can be automatically or manually executed. The procedure can be documented and presented so that an operator with a minimum of technical or scientific training can easily and accurately follow instructions for carrying out a manual procedure.

In FIG. 2A, a procedure shown in a flow diagram 200, in an exemplary embodiment, may begin 202 and may continue with a user documenting 204 a procedure with a graphical interface. The user may graphically document 204 a procedure flow chart using an interactive graphical user interface tool similar to that shown and described further below with reference to FIG. 3B using such software components as illustrated and discussed further below with reference to FIG. 3A. In FIG. 2A, a graphical visual procedure interface format for documenting graphically visual operation information may include, for example, but not limited to, a format of a MICROSOFT® VISIO®-compatible extended graphical application. In an exemplary embodiment, the graphical system may be an extension of VISIO® referred to as Augmented Manual Procedures, which is available from NovaTech Process Solutions, LLC of Owings Mills, Md. U.S.A. For example, the graphical system may be an "add-in" module, where, for example, the "add-in" module may interact with another program, such as, but not limited to, VISIO®. The rules and an array of tools for documenting graphically visual operation information may be included in the "add-in" module. These rules may, for example, govern how a textual description is related to graphic representation of operation information or how a graphically represented procedure and associated textual information may be placed in an intermediate format such as a data container language. For example, the rules may govern how data is placed into a data container language format. VISIO®, for example, may serve to support the drawing of graphic representations of a procedure. In an exemplary embodiment, at least a portion of the visual operation information may be received from a visual operation information library. In another exemplary embodiment, at least a portion of the visual operation information may be stored in a visual operation information library. An advantage of a graphical interface can be that a designer is forced to form logical connections of actions and decisions, so that the procedure does not have dead ends and incorrect logic.

In FIG. 2A, after the user graphically documents 204 the procedure flow chart, the process continues and the user can add 206, in an exemplary embodiment, one or more textual descriptions of the procedure using a free form text description. In an exemplary embodiment, the free form text description may be long, for example, up to a pre-defined length, for example, but not limited to, 32,767 characters. The free form text description may include special characters, such as international characters, characters from non-Latin alphabets, e.g., but not limited to, Greek, as well as the Latin alphabet, and mathematical and other symbols. The free form text description may include, in an exemplary embodiment, formatting such as, e.g., but not limited to, underlining, bolding, italicizing, and paragraphing with a line return and indenting. The free form text description may include a verb description and an object description. For example, a verb description may be selected from a list of sample verb descriptions displayed in a GUI, or a verb description not in the list of sample verb descriptions may be entered by a user. For example, an object description may be selected from a list of sample object descriptions displayed in the current or another GUI, or an object description not in the list of sample object descriptions may be entered by a user. In an exemplary embodiment, the description may include an association of the combination of the verb description and the object description with a computer function language for possible use in later automated execution, where the association of the combination may be selected from a list displayed in yet another GUI. User 102 may also add additional information, i.e., additional step parameters, about the visual operation information. For example, the user may add 206 a data validation range, which, for example, includes bounds on a value an operator can enter for the value to be accepted.

In FIG. 2A, the user may add 206 an authentication request, which requires an authorized person, for example, but not limited to, an operator, a supervisor, an engineer, a process designer, or other personnel directly or indirectly involved with the design or execution of the process, to electronically or otherwise sign off on a step. The user may add 206 a shell command; a shell command may cause, for example, but not limited to, an internet page containing product information on a component of machinery used in a process, e.g., but not limited to, a valve, to be displayed to an operator during execution of the process. The user may add 206 other step parameters about the visual operation information, for example, but not limited to, information indicating that a specific solenoid should open a valve during a step during automatic execution of the process. After adding 206, the procedure in flow diagram 200 may continue with, in an exemplary embodiment, the just documented procedure may be reviewed and approved 208. If the reviewed and approved process 208 is not performed, the flow diagram 200 may continue from adding 206 and build 210 the procedure created in 204—206. If the reviewed and approved process 208 is performed, the flow diagram 200 may continue from there and build 210 the procedure created in 204-208.

In FIG. 2A, in an exemplary embodiment, the graphically represented procedure and associated textual information may be built 210 and converted to a computer function language. Once built 210 and converted to the computer function language, the procedure is uploaded 212 to a database for storage for future use. Existing PDF procedures are also stored 214 in the database for use with the uploaded 212 procedure(s). Once the uploading 212 is complete the process ends 216.

In an exemplary embodiment, the procedure may be stored 214 in a standard format that may allow ready access to the procedure. In one exemplary embodiment, the intermediate format may be a data container language. In an exemplary embodiment, the data container language may be an extensible markup language (XML) format. In another exemplary embodiment, a document file is provided from the information in data container language format. For example, an image document in a substantially unalterable format may be generated from information in the data container language format. Alternatively, a document in an alterable format may be generated from information in the data container language format. In an exemplary embodiment, a document in an alterable format may be generated from information in the data container language format and an image document in a substantially unalterable format may be generated from the document in an alterable format. An image document may be time stamped. An example of a substantially unalterable format is the PORTABLE DOCUMENT FORMAT (PDF). The substantially unalterable format may include a format accepted by a regulatory organization.

Figure 2B:
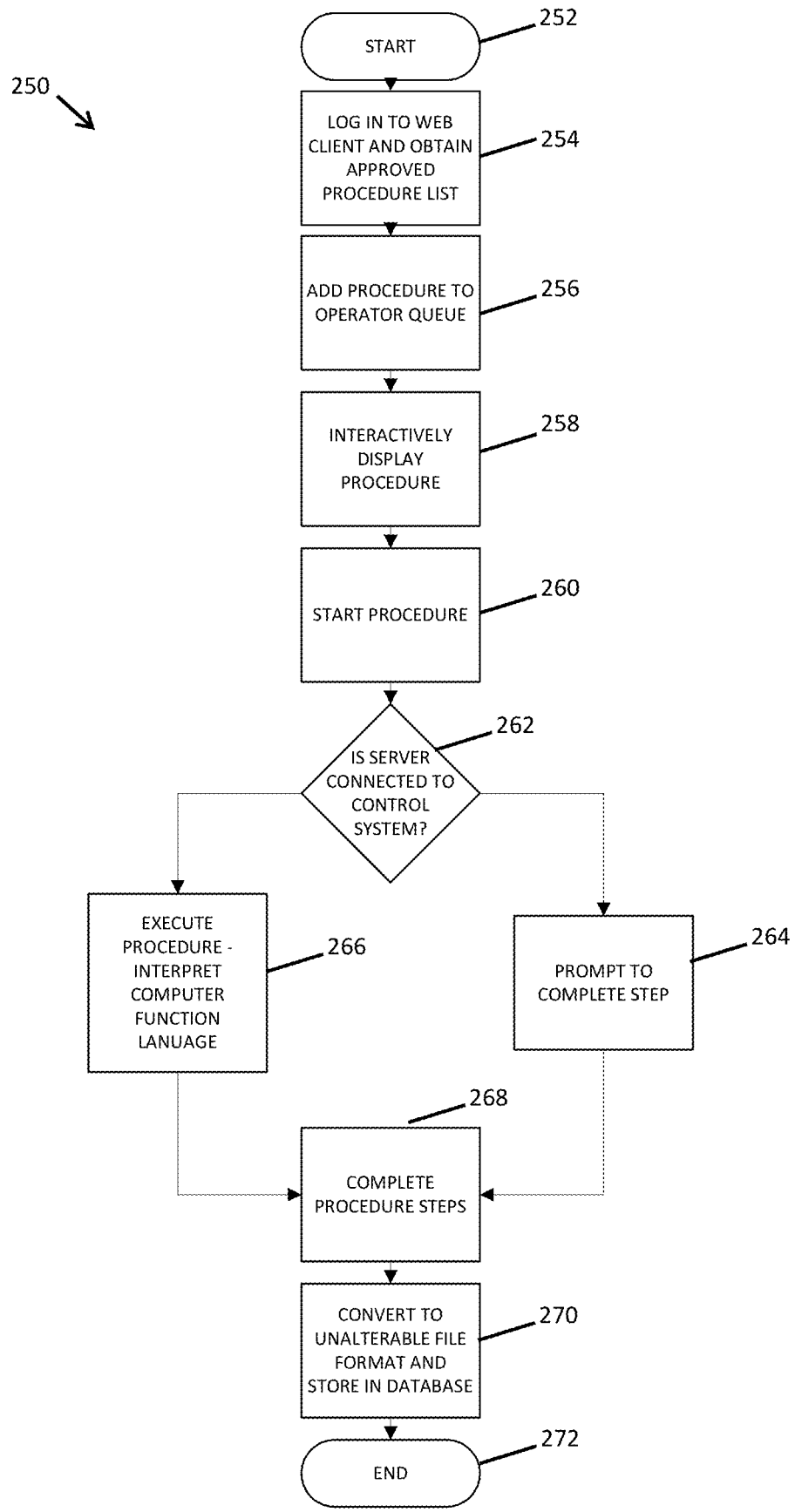
FIG. 2B depicts an exemplary embodiment of a flow diagram illustrating an exemplary process of documenting and managing a procedure that may include manual, computer assisted and automatic execution, interactive display, and storage in alterable and/or unalterable format of a procedure execution according to an exemplary embodiment of the disclosed subject matter.

In FIG. 2B, in an exemplary embodiment, the procedure(s) built 210 and converted to a computer function language and uploaded 212 to the database can be selected by a specific user(s) to be executed. In FIG. 2B, a procedure shown in a flow diagram 250, in an exemplary embodiment, may begin 252 and may continue with an operator logging in 254 to a web client to obtain an approved procedures list that the operator can perform. The operator may select a procedure and add 256 it to an operator queue for execution after which the procedure may be interactively displayed 258 and the procedure may start 260. For example, the procedure may be displayed 258 as a scrolling, step-by-step listing of the procedure (see, for example, FIGS. 5A-5D. Although not seen in FIGS. 5A-5D, videos, in one or more exemplary embodiments, still images or even graphic drawings or representations of fiducial markers can appear in one or more pop up GUI window interfaces during execution of the procedure to aid the operator in knowing the correct position of a part of the system and/or the proper direction in which to move the part.

Returning to FIG. 2B, the procedure next determines 262 whether it is connected to a control system and, if no, executes the procedure as a manual process and prompts 264 the operator to complete the step. If it is determined 262 the procedure is connected to a control system, then the procedure is executed 266 automatically by interpreting the computer function language. For example, the computer function language may be sent to an interpreter to automatically execute the procedure. The interpreter programmed with the steps of the procedure may be a distributed control unit, for example, a real-time feedback control unit which uses information of the physical state of a chemical or material which the process transforms. Such a feedback control unit may use, for example, a measured temperature of a chemical to set an appropriate voltage across a heating coil. The steps of the procedure in computer function language format may be sent to two or more interpreters, for example, two or more distributed control units may be programmed.

In FIG. 2B, in an exemplary embodiment, the status of a manually or automatically executed procedure, including, for example, the steps executed and results of a step, are stored in a standard format such as a data container language. The timing of completion of a step and an authentication may be stored in a data container language. The operator may update a procedure stored in a data container language by, for example, entering a value to represent the result of a step; for example, the operator may indicate whether the appearance of a mixture is smooth or granular. Automatically obtained information from a process, such as temperature data from a thermocouple, may be stored in a data container language to represent the result of a step. An updated procedure stored in a data container language format in the database may be filed with a regulatory organization. The data container language may be, for example, but not limited to, XML or SGML. Examples of regulatory organizations may include governmental agencies such as the U.S. Food and Drug Administration (FDA), the U.S. Department of Energy (DOE), the U.S. Nuclear Regulatory Commission (NRC), the U.S. Department of Agriculture (USDA), the U.S. Department of Defense (DOD), or the U.S. Department of Health and Human Services (DHHS). Regulatory organizations may also include private certification organizations, for example, but not limited to, UNDERWRITERS LABORATORIES INC.® (UL), and quasi-governmental organizations, for example, but not limited to, International Organization for Standardization (ISO). An example of an alterable electronic format that is used during execution of a procedure, is standard generalized mark-up language (SGML) or an SGML-derived format such as XML. In addition to the operator being able to change the procedure, live results and operator comments can be added to the procedure to provide a history of each execution of the procedure. In an exemplary embodiment, the operator may add comments. The comments may be text of any length, up to a flexibly architected limit, for example, but not limited to, a flexibly architected limit of 32,767 characters. In another exemplary embodiment, the user may be required to authenticate using a user name and password or user name and password entry by a supervisor of input that a step was approved to perform. Extensible markup language (XML) is a meta-language, not a single, predefined markup language. XML allows one to design one's own markup. XML is used to describe the structure of data, so anywhere that data is input, output, stored, or transmitted from one place to another, may benefit from the application of XML. XML is a specification developed by the W3C consortium. XML is a pared-down version of SGML. XML is designed especially for Web documents. XML allows designers to create their own customized tags, enabling definitions, transmission, validation, and interpretation of data between applications and between organizations.

In FIG. 2B, regardless of whether the server is determined 262 to be connected to a control system, the procedure completes 268 the procedure steps and then converts 270 the results to an unalterable file format and stores the resultant unalterable file format in the database. Once the conversion 270 and storage is complete the procedure can end 272.

FIG. 3A depicts an exemplary embodiment of a partial screenshot 320 of an exemplary set of graphical building components displayed in an exemplary window 302 that may be used in an exemplary GUI environment including a system for documenting a procedure graphically according to an exemplary embodiment of the disclosed subject matter. One graphical building component, in an exemplary embodiment, may be termed a dynamic connector 322, and may be used to link together any two graphical building components. The execution or performance of a graphical building component to which the end of the dynamic connector 322 with no arrow may be linked may precede the execution or performance of a graphical building component to which the end of the dynamic connector 322 with an arrow may be linked. A decision box 324 may, in an exemplary embodiment, indicate a determination, or prompting for decision information from an operator or from a device, such as, e.g., but not limited to, a PLC. Information prompted for may include, for example, a value. A decision mode bar 334 may, in an exemplary embodiment, follow a decision box, and indicate that one or more of several actions may follow from a value received in response to a prompt from a decision box 324.

Further in FIG. 3A, an answer box 326, in an exemplary embodiment, may indicate that if, in response to a prompting for information, a value is received that is equivalent to the value in the answer box, then the action specified in a subsequent action box 328 may be performed. Another decision mode bar 334 and a terminator box 342 may, for example, follow an action box and may, in an exemplary embodiment, indicate that a response to the prompting indicated by a decision box 324 has been received and appropriate action taken. A note box 338, in an exemplary embodiment, may be inserted into a representation of a procedure in a GUI environment. The note box 338 provides information to an operator in a verbose form. A table box 332, in an exemplary embodiment, may be inserted into a representation of a procedure in a GUI environment to allow the designer to enter information directing one or more steps, for example, verb descriptions and object descriptions, in a tabular format. A table box 332 may be inserted into a representation of a manual procedure or may be inserted into a representation of an automatic procedure; for example, a table box 332 may include information directing a process during automatic execution. A table box 332 may cause a matrix to be presented to an operator, for example, to be displayed to an operator in a procedure overview display. A designer may designate a column or columns in the matrix for one or more classes of information, for example, for a verb description or an object description. Each row of the matrix may represent, for example, an action step. When a step represented in the matrix is manually completed, an operator may so indicate; a symbol next to a row may change, for example, may change color or shading, to indicate that the step represented by the row has been completed. When a step represented in the matrix is automatically completed, a symbol next to a row may change, for example, may change color or shading, to indicate that the step represented by the row has been completed. The table box may be represented in, for example, an approved PDF file or in an executed PDF file, as a matrix.

In FIG. 3A, an optional group bar 336, in an exemplary embodiment, may be inserted to indicate that execution of several procedural chains follows; the leftmost procedural chain is executed first, then each successive procedural chain to the right is executed. Another group bar 336 following these procedural chains, in an exemplary embodiment, terminates the execution grouping. The side transition box 340 determines whether a specified condition exists, and based on whether or not the condition exists, transfers execution to another procedural chain or allows execution to continue along the current procedural chain. In an embodiment, a user may design a multi-section procedure and graphically document the multi-section procedure as visual operation information. For example, the user may insert the group bar 336 and indicate that the group bar 336 has the multi-select property. The user may place one or more procedural chains below the group bar 336, each procedural chain representing a section. Another group bar 336 and a terminator following the procedural chains may indicate termination of the execution grouping; additional shapes in a single chain may follow this other group bar 336 and terminator. When an operator reaches the step in the procedure indicated by the group bar 336 with the multi-select property preceding the one or more procedural chain(s), the display may present the operator with a multi-select question, that is, with a choice of which of the one or more procedural chain(s) should be executed. The operator may select which procedural chain or chains to execute. Before a procedural chain selected for execution in response to the multi-select question is executed, the display may present the operator with a request for verification that the procedural chain is to be executed. If the operator responds that the procedural chains is to be executed, then the procedural chain is executed. If the operator responds that the procedural chain is not to be executed, then if the operator had indicated that another procedural chain is to be executed, the display may present the operator with a request for verification that the other procedural chain is to be executed. After a procedural chain has been executed, if another procedural chain had been selected for execution in response to the multi-select question, the display may present the operator with a request for verification that the other procedural chain is to be executed. After each selected procedural chain or chains has or have been executed, execution may continue with the steps indicated by the additional shapes in the single chain following the other group bar 336 and terminator, rather than with any other procedural chain or chains between the group bar 336 with the multi-select property and the other group bar 336 that were not selected. In an approved PDF document, which may present the procedure, but not results of execution, the multi-select question is presented in a Preliminary Actions section of the document. In an executed PDF document, the multi-select question may be presented as in the approved PDF document; the full text of sections that were executed and sections that were skipped may be presented. However, an additional notation at the top of a skipped section may indicate that the section was skipped. An approved PDF document may, for example, be printed for use by an operator. For example, in a method, a user may direct that the approved PDF document be printed with checkboxes next to each step; an operator may use these checkboxes to indicate the completion of a step and progress of the process. Providing an operator with a printed approved PDF document may be useful, for example, when the operator is at a remote location where no computer is available.

Figure 3B:
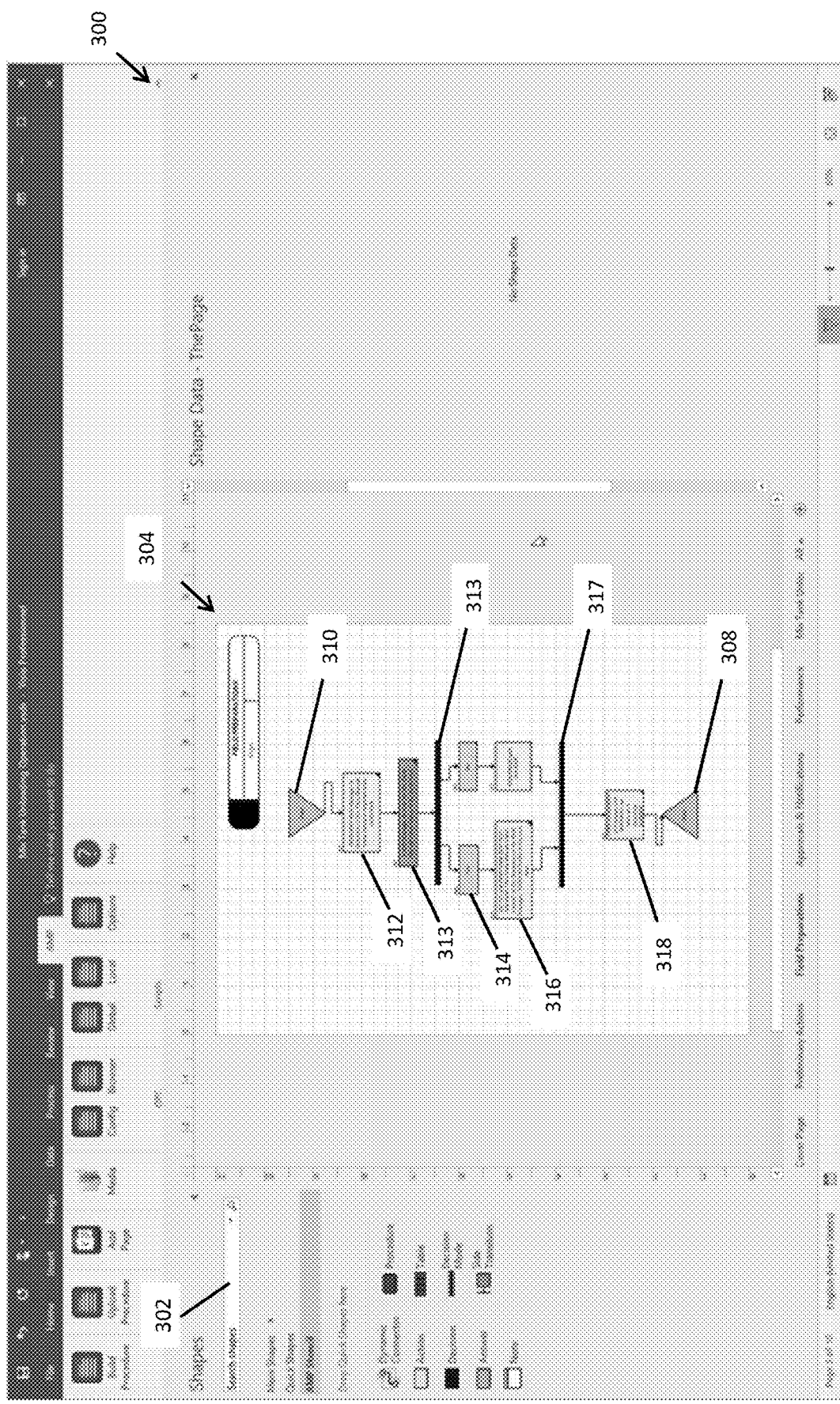
FIG. 3B depicts an exemplary embodiment of a screenshot of an exemplary GUI environment illustrating an exemplary system for documenting a procedure graphically according to an exemplary embodiment of the disclosed subject matter.

FIG. 3B depicts an exemplary embodiment of a screenshot 300 of an exemplary graphical user interface (GUI) environment illustrating an exemplary application software GUI system for documenting a procedure graphically according to an exemplary embodiment of the disclosed subject matter. In an exemplary embodiment, a graphical building component 310 that may indicate the start of a process and a graphical building component 308 that may indicate the end of a process may be present on the canvas 304. A process or procedure designer may, in an exemplary embodiment, add graphical building components by dragging from an object template on window 302 and dropping onto the canvas 304. A decision graphical component 312 may signify a conditional step or steps: one or more steps may be performed in the process depending on the value of data received. For example, a decision box 312, in an exemplary embodiment, may prompt an operator for a response to a question. As shown in 300, a decision box 312 that may represent a question within a procedure, may be included. The decision mode bar 313 may signify entry into a decision mode. The answer box 314 may signify the value, that if received, may trigger a subsequent action or set of actions such as, for example, but not limited to, represented by the answer box 316. A decision mode bar 317 and a terminator box 318, in an exemplary embodiment, may follow the action box 316, to indicate that appropriate action based on a response to the prompting indicated by a decision box 312 (not fully shown) has been taken and the decision mode has been exited. Also indicated in FIG. 3B at 306 are spaces for the entry of a free form text description; in the case illustrated in 300, the free form text description is associated with the decision graphical component 312. Shown in 306 are other textual components such as a verb description, a question, a comment, and a DCS function, which may be used to map a graphical procedure to an automated process step via a computer function language such as, e.g., but not limited to, OPC and Lua for non-proprietary connections and, if desired, NOVATECH® D/3® Distributed Control System Proprietary Sequence and Batch Language (SABL®) available from NovaTech Process Solutions. As shown in diagram 300, multiple procedures may be viewed, and displayed by selection of a folder tab 319, in an exemplary embodiment.

Figure 3C:
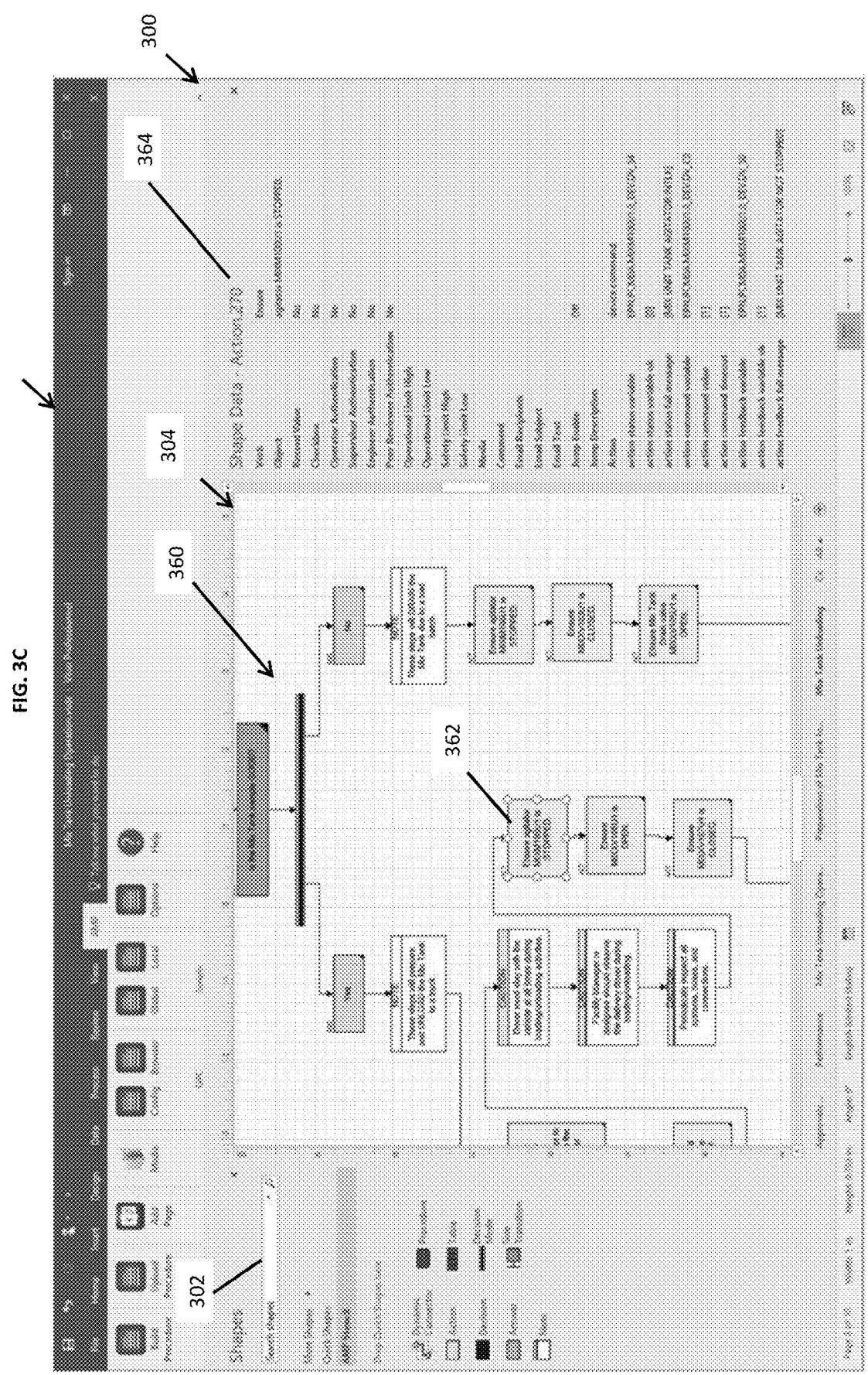
FIG. 3C depicts an exemplary embodiment of a screenshot of an exemplary interactive procedure execution display GUI environment illustrating an exemplary system for displaying, monitoring and managing execution automatically of a procedure according to an exemplary embodiment of the disclosed subject matter.

FIG. 3C depicts an exemplary embodiment of a screenshot 300 of an exemplary graphical user interface (GUI) environment illustrating an exemplary application software GUI system for documenting a procedure graphically according to an exemplary embodiment of the disclosed subject matter. In FIG. 3C, a view of a section of a flow diagram 360 for a procedure similar to that seen in FIG. 3B is shown after having been created and/or imported into the workspace. A single element 362 is shown as having been selected by the white circles around a perimeter of the element 362 and in a section 364, data about the element is presented. For example, this data can include verb, object, record, authentication values for the element.

Figure 3D:
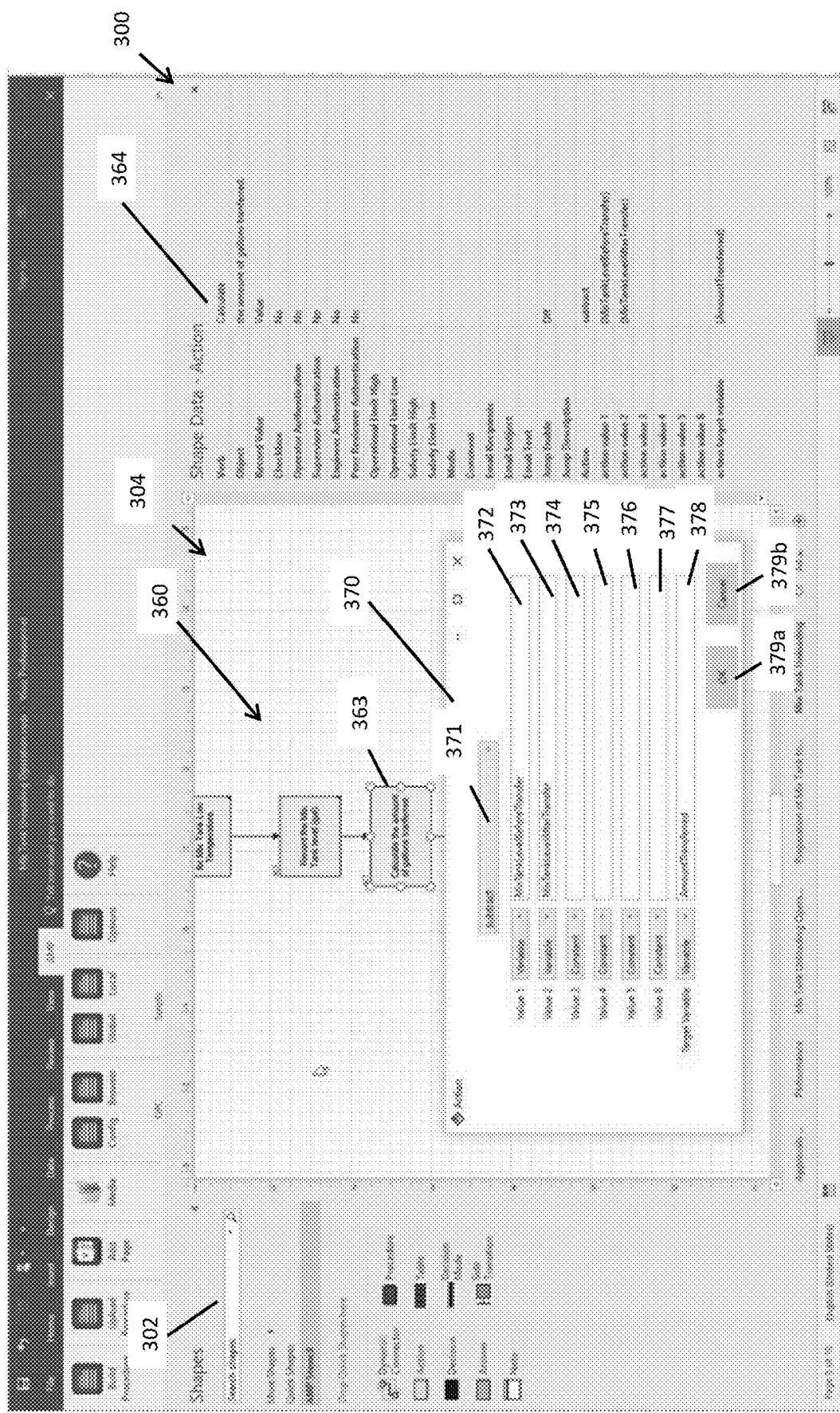
FIG. 3D depicts another exemplary embodiment of a screenshot of an exemplary GUI environment illustrating an exemplary application software GUI system for documenting a procedure graphically according to an exemplary embodiment of the disclosed subject matter.

FIG. 3D depicts another exemplary embodiment of a screenshot 300 of an exemplary graphical user interface (GUI) environment illustrating an exemplary application software GUI system for documenting a procedure graphically according to an exemplary embodiment of the disclosed subject matter. In FIG. 3D, a view of a section of a flow diagram 360 for a procedure similar to that seen in FIG. 3B is shown on the canvas 304 after having been created and/or imported into the workspace. Another element 363 is shown as having been selected by the white circles around a perimeter of the element 363. An action entry region 370 is displayed over top of a portion of the flow diagram 360 and the canvas 304. The action entry region 370 includes an action drop down menu button 371 from which a user may select an action to be associated with the flowchart element 363. The action entry region 370 also includes multiple value drop down menus 372-377 from which values, i.e., variable and constant values, may be selected and defined by the user; and a target variable drop down menu 378 from which the user may select and define the target variable associated with the flowchart element 363. The action entry region 37 also includes an OK, i.e., an accept entries, button 379a and a Cancel, i.e., do not accept entries, button 379b to permit the user to exit and save the entries with the OK button 379a or exit and do not save the entries with the Cancel button 379b.

Figure 3E:
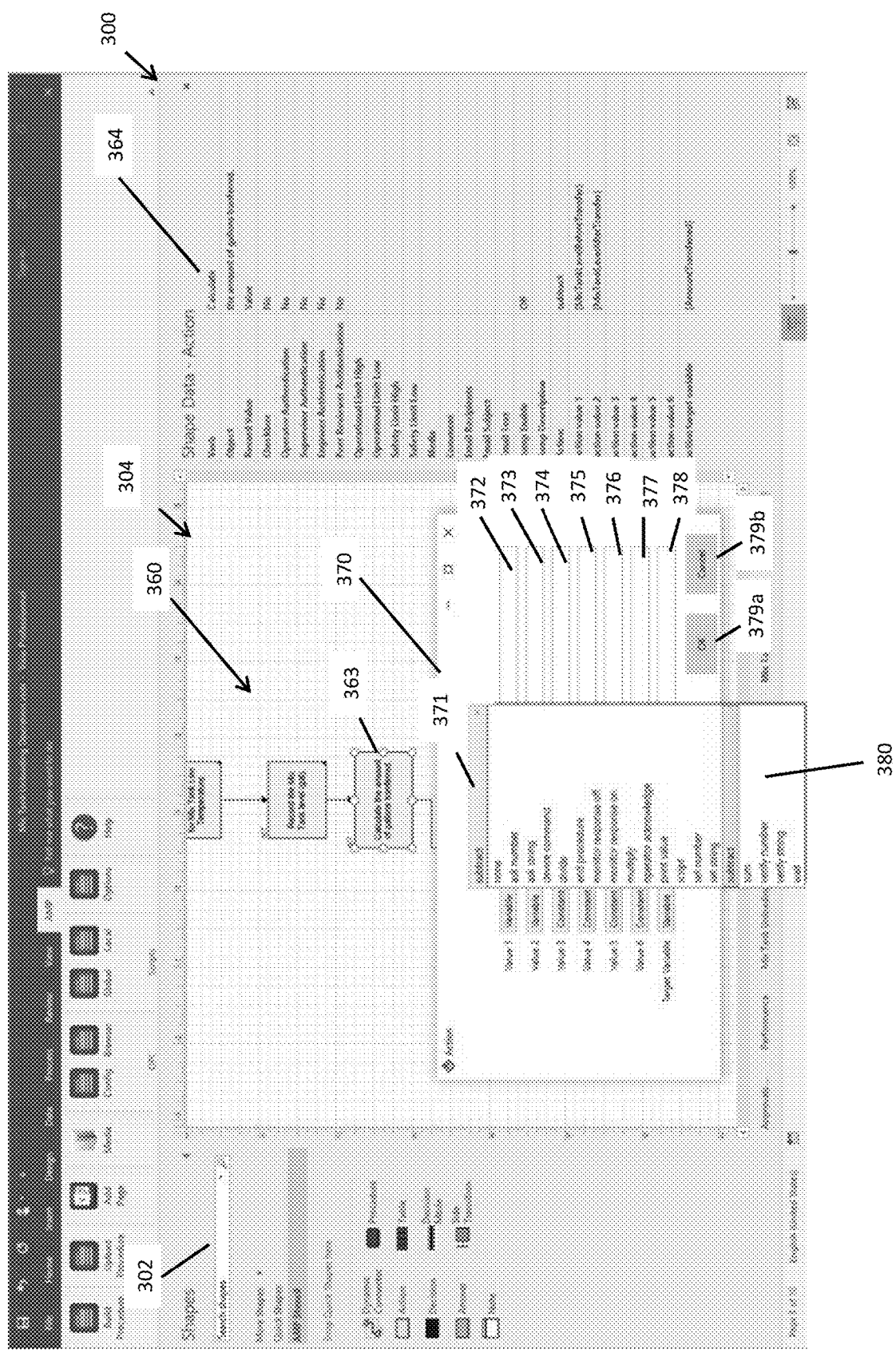
FIG. 3E depicts another exemplary embodiment of a screenshot of an exemplary GUI environment illustrating an exemplary application software GUI system for documenting a procedure graphically according to an exemplary embodiment of the disclosed subject matter.

FIG. 3E depicts another exemplary embodiment of a screenshot 300 of an exemplary graphical user interface (GUI) environment illustrating an exemplary application software GUI system for documenting a procedure graphically according to an exemplary embodiment of the disclosed subject matter. In FIG. 3E, the view of a section of the flow diagram 360 for the procedure with the action entry region 370 as seen in FIG. 3D is shown with the action drop down menu button 371 selected so a menu 380 of available actions is displayed over top of a portion of the action entry region 370. The menu 380 includes a list of possible actions, e.g., but not limited to, none, ask number, divide, multiply, print value, subtract, etc. The user scrolls down and clicks on the desired action and it is displayed in the action drop down menu button 371.

Figure 3F:
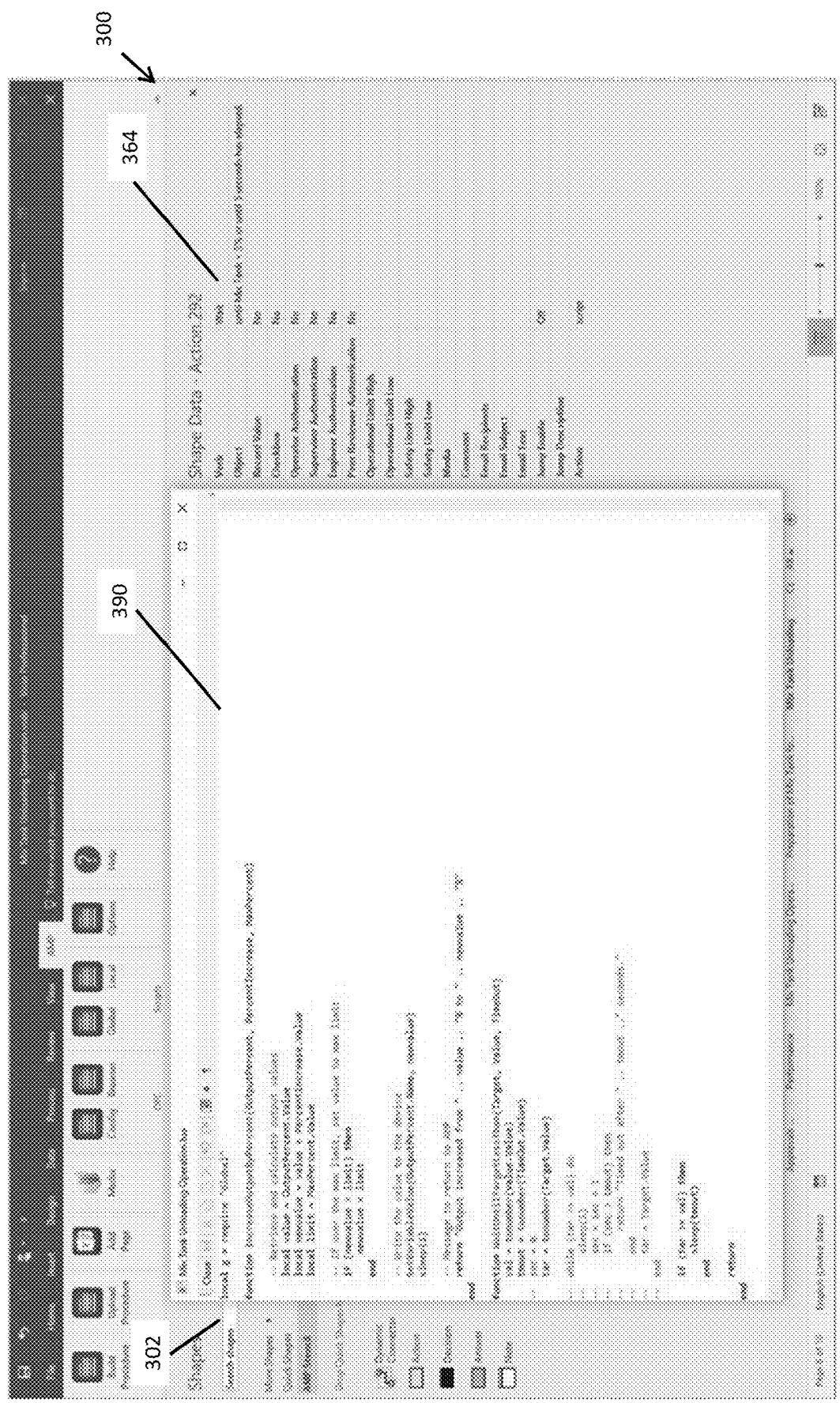
FIG. 3F depicts another exemplary embodiment of a screenshot of an exemplary GUI environment illustrating an exemplary application software GUI system for documenting a procedure graphically according to an exemplary embodiment of the disclosed subject matter.

FIG. 3F depicts another exemplary embodiment of a screenshot 300 of an exemplary graphical user interface (GUI) environment illustrating an exemplary application software GUI system for documenting a procedure graphically according to an exemplary embodiment of the disclosed subject matter. In FIG. 3F, a view of a script entry region 390 is displayed over top of the flow diagram 360 and the canvas 304. The script entry region 390 includes a text entry region for writing scripts that are to execute when a specific element in the flowchart is reached during the execution of the defined procedure.

Figure 4:
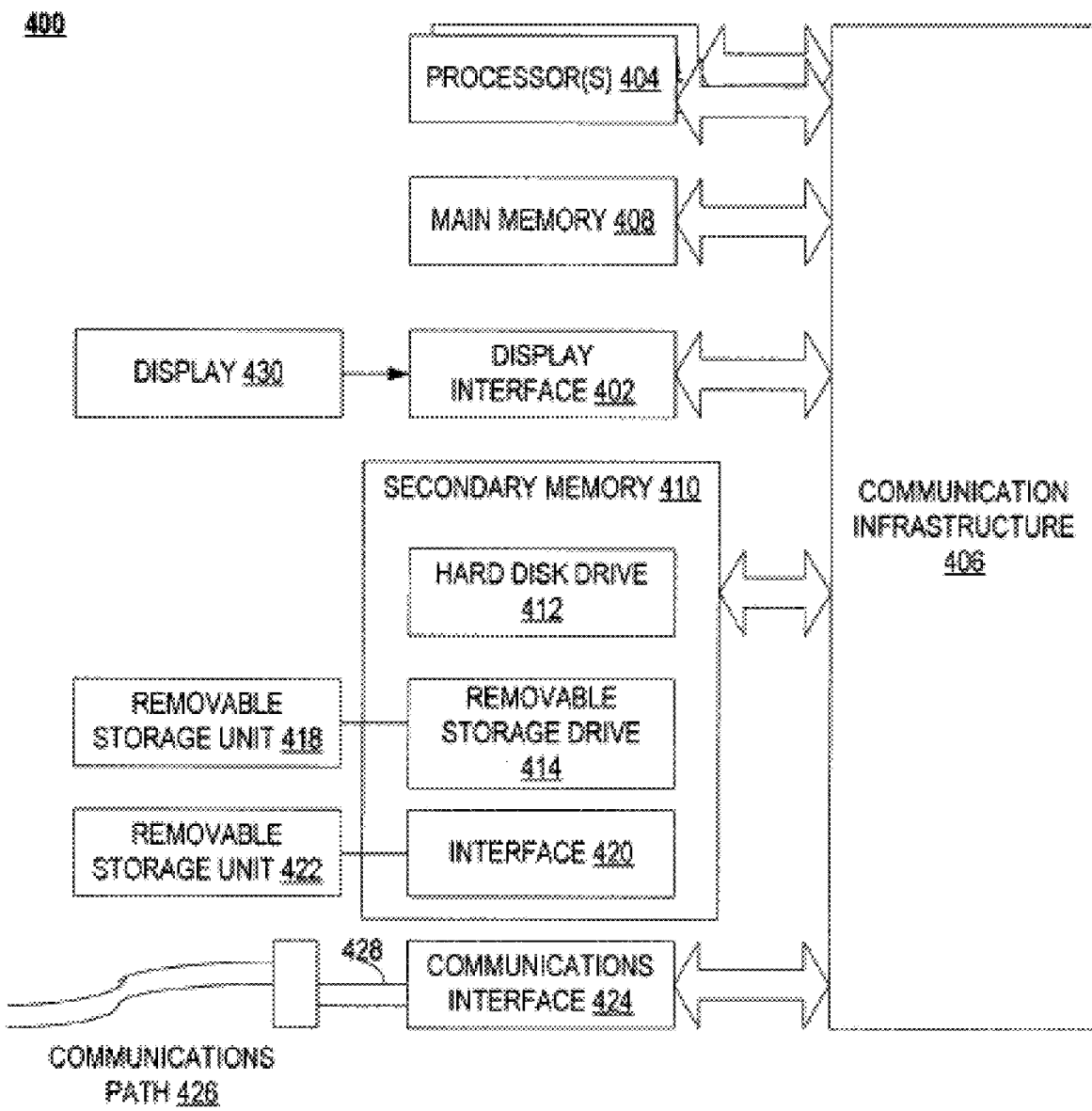
FIG. 4 depicts an exemplary embodiment of a computer system that may be used in any of the computing devices of an exemplary embodiment of the disclosed subject matter.

FIG. 4 depicts an exemplary embodiment of a computer system 400 that may be used in any of the computing devices such as, e.g., but not limited to, devices 104, 108, and 110 of the exemplary embodiment of the disclosed subject matter. The disclosed subject matter (or any part(s) or function(s) thereof) may be implemented using hardware, software, firmware, or a combination thereof and may be implemented in one or more computer systems or other processing systems. In fact, in one exemplary embodiment, the disclosed subject matter may be directed toward one or more computer systems capable of carrying out the functionality described herein. An exemplary computer system 400 is shown in FIG. 4, depicting an exemplary but not limiting embodiment of a block diagram of a computer system that may be useful for implementing the disclosed subject matter. Specifically, FIG. 4 illustrates computer system 400, which in an exemplary embodiment may be, but is not limited to, a personal computer (PC) system running an operating system 124 such as, e.g., but not limited to, MICROSOFT® WINDOWS® NT/98/2000/XP/Windows 7, 8, 10/Server 2016/Server 2012R2/etc. available from MICROSOFT Corporation of Redmond, Wash., U.S.A. In an alternative embodiment, other operating systems 124 may be used such as, e.g., but not limited to, SOLARIS® from SUN Microsystems of Santa Clara, Calif., U.S.A., OS/2 from IBM Corporation of Armonk, N.Y., U.S.A., Mac/OS from APPLE Corporation of Cupertino, Calif., U.S.A., or any of various versions of UNIX® (a trademark of the Open Group of San Francisco, Calif., USA) including, e.g., but not limited to, LINUX®, HPUX®, IBM AIX®, and SCO/UNIX®, etc. However, the disclosed subject matter may not be limited to these platforms. Instead, the disclosed subject matter may be implemented on any appropriate computer system running any appropriate operating system. Other components of the disclosed subject matter, such as, e.g., but not limited to, a computing device, a communications device, a telephone, a personal digital assistant (PDA), a handheld personal computer (PC), a subnotebook PC, a notebook PC, a laptop PC, a desktop PC, network appliance, workstation, thin client, fat client, proxy server, network communication server, remote access device, client computer, server computer, router, web server, data, media, audio, video, telephony or streaming technology server, programmable logic controller (PLC), etc., may also be implemented using a computer such as that shown in FIG. 4.

In FIG. 4, the computer system 400 may include, in an exemplary embodiment, one or more processors, such as, e.g., but not limited to, processor(s) 404. The processor(s) 404 may be coupled to a communication infrastructure 406 (e.g., but not limited to, a communications bus, backplane, cross-over bar, or network). Various software embodiments may be described in terms of this exemplary computer system. After reading this description, it will become apparent to a person skilled in the relevant art(s) how to implement the disclosed subject matter using other computer systems and/or architectures.

In FIG. 4, the computer system 400 may include a display interface 402 that may include, e.g., but not limited to, graphics, text, and other data, etc. from the communication infrastructure 406 (or from a frame buffer not shown) for display on display 430. The computer system 400 may also include, e.g., but not limited to, a main memory 408, such as, e.g., but not limited to, random access memory (RAM), and a secondary memory 410, etc. The secondary memory 410 may include, for example, but not limited to, a storage device such as, e.g., but not limited to, hard disk drive 412 and/or a removable storage drive 414, representing, e.g., but not limited to, a floppy diskette drive, a magnetic tape drive, an optical disk drive, a compact disk drive CD-ROM, etc. The removable storage drive 414 may read from and/or write to a removable storage unit 418 in a well known manner. Removable storage unit 418, also called a program storage device, machine readable medium, or a computer program product, may represent, e.g., but is not limited to, a floppy disk, magnetic tape, optical disk, compact disk, etc., which may be read from and written to by removable storage drive 414. As will be appreciated, the removable storage unit 418 may include a computer usable storage medium having stored therein computer software and/or data. For example, the machine-readable medium may include flash memory devices; electrical, optical, acoustical or other form of propagated signals (e.g., but not limited to, carrier waves, infrared signals, digital signals, etc.), and others.

In alternative exemplary embodiments, in FIG. 4, the secondary memory 410 may include other similar devices for allowing computer programs or other instructions to be loaded into computer system 400. Such devices may include, for example, (but are not limited to) a removable storage unit 422 and an interface 420. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket), and other removable storage units 422 and interfaces 420, etc., which may allow software and data to be transferred from the removable storage unit 422 to computer system 400.

In FIG. 4, the computer 400 may also include an input device such as, e.g., but not limited to, a mouse or other pointing device such as a digitizer, and a keyboard or other data entry device, etc. (none of which are labeled). Computer 400 may also include output devices, such as, e.g., but not limited to, display 430, and display interface 402, etc. Computer 400 may include input/output (I/O) devices such as, e.g., but not limited to, communications interface 424, cable 428 and communications path 426. These may include, e.g., but not limited to, a network interface card, and modems (neither are labeled). Communications interface 424 may allow software and data to be transferred between computer system 400 and external devices. Examples of communications interface 424 may include, e.g., but not limited to, a modem, a network interface (such as, e.g., but not limited to, an Ethernet card), a communications port, a Personal Computer Memory Card International Association (PCMCIA) or PCCard slot and card, etc. Software and data transferred via communications interface 424 may be in the form of signals 428 which may be electronic, electromagnetic, optical or other signals capable of being received by communications interface 424. These signals 428 may be provided to communications interface 424 via a communications path (e.g., but not limited to, channel) 426. This channel 426 may carry signals 428 and may be implemented using, e.g., but not limited to, wire or cable, fiber optics, a telephone line, a cellular link, a radio frequency (RF) link and other communications channels, etc.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the disclosed subject matter may include apparatuses for performing the operations herein. An apparatus may be specially constructed for the desired purposes, or it may comprise a general purpose device selectively activated or reconfigured by a program stored in the device.

In this document, the terms "computer program medium" and "computer readable medium" may be used to generally refer to media such as, e.g., but not limited to, removable storage drive 414, a hard disk installed in hard disk drive 412, and signals 428. These computer program products provide software to computer system 400. The disclosed subject matter may be directed to such computer program products.

Computer programs (also called computer control logic), including object oriented computer programs, may be stored in main memory 408 and/or the secondary memory 410 and/or removable storage units 414, also called computer program products. Such computer programs, when executed, may enable the computer system 400 to perform the features of the disclosed subject matter as discussed herein. In particular, the computer programs, when executed, may enable the processor 404 to perform the features of the disclosed subject matter. Accordingly, such computer programs may represent controllers of the computer system 400.

In another exemplary embodiment, the disclosed subject matter may be directed to a computer program product comprising a computer readable medium having control logic (computer software) stored therein. The control logic, when executed by the processor 404, may cause the processor 404 to perform the functions of the disclosed subject matter as described herein. In another exemplary embodiment where the disclosed subject matter may be implemented using software, the software may be stored in a computer program product and loaded into computer system 400 using removable storage drive 414, hard drive 412 or communications interface 424. The control logic (software), when executed by the processor 404, may cause the processor 404 to perform the functions of the disclosed subject matter as described herein. The computer software may run as a standalone software application program running atop an operating system, or may be integrated into the operating system.

In yet another exemplary embodiment, the disclosed subject matter may be implemented primarily in hardware using, for example, but not limited to, hardware components such as application specific integrated circuits (ASICs), or one or more state machines. Implementation of the hardware state machine to perform the functions described herein will be apparent to persons skilled in the relevant art(s). In another exemplary embodiment, the disclosed subject matter may be implemented in firmware. In yet another exemplary embodiment, the disclosed subject matter may be implemented using a combination of any of hardware, firmware and/or software.

Embodiments of the disclosed subject matter may also be implemented as instructions stored on a machine-readable medium, which may be read and executed by a computing platform to perform the operations described herein. A machine-readable medium may include any mechanism for storing or transmitting information in a form readable by a machine (e.g., but not limited to, a computer).

Exemplary wireless communication technologies may include, e.g., but not limited to, an Infrared Data Association (IrDA)-compliant wireless technology, a short range radio frequency (RF) technology such as, e.g., but not limited to, a Bluetooth-compliant wireless technology, an IEEE standard 802.11-compliant wireless local area network (WLAN) such as, e.g., but not limited to a network compliant with IEEE Std 802.11a, b, d or g, such as, e.g., but not limited to, of version IEEE Std 802.11, 1999 Edition; or IEEE Std 802.11a-1999, IEEE Std 802.11b-1999, IEEE Std 802.11b-1999/Cor 1-2001, IEEE Std 802.11d-2001, IEEE Std 802.11-1999 (R2003), and/or IEEE 802.11g-2003, etc., a Shared Wireless Access Protocol (SWAP)-compliant wireless technology, a wireless fidelity (Wi-Fi)-compliant wireless technology, and/or an ultra-wide band (UWB) wireless technology network.

Figure 5:
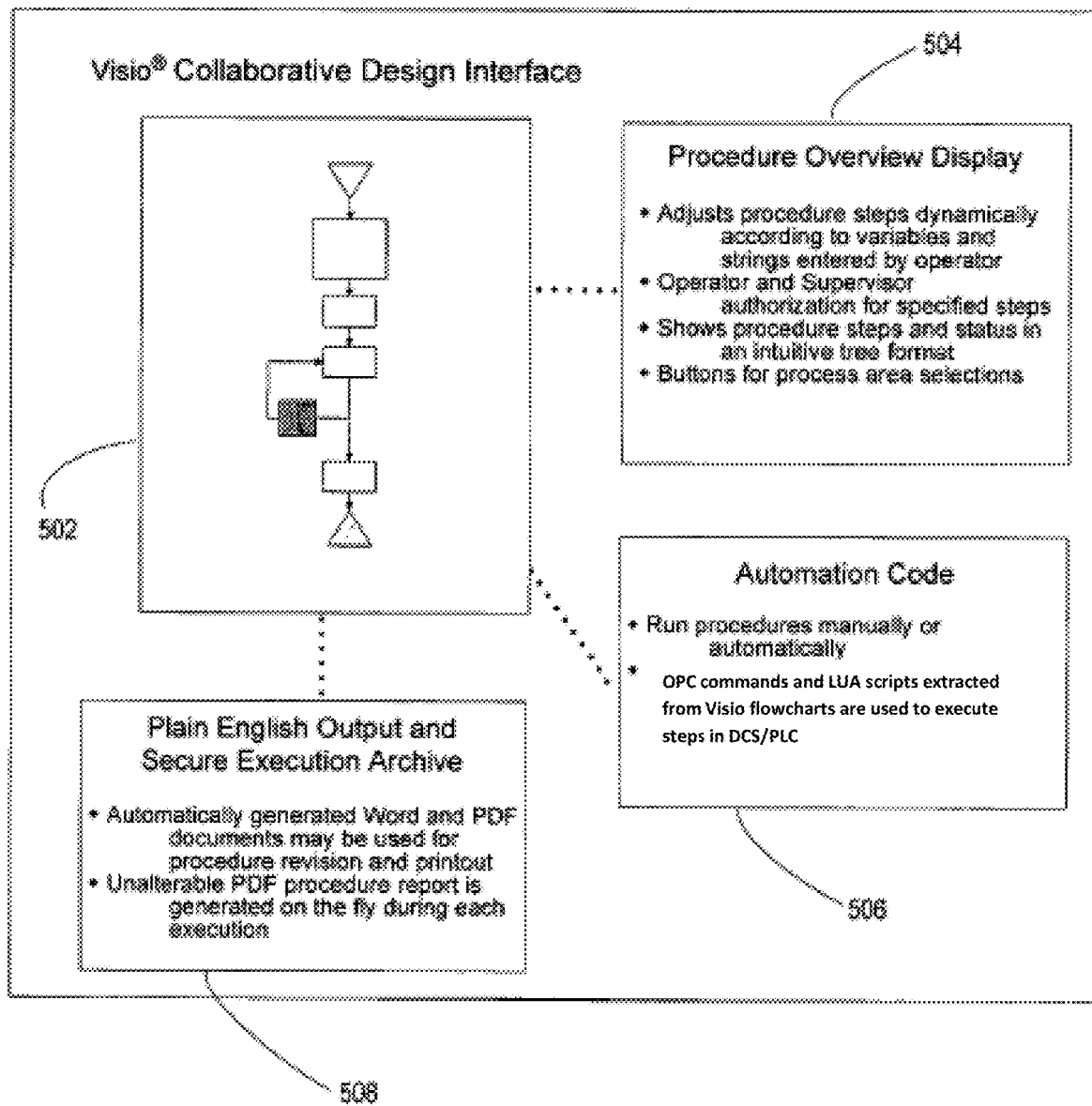
FIG. 5 depicts a composite image representing several aspects of the disclosed subject matter, which can be implemented in a GUI environment, including an exemplary system for documenting a procedure graphically (for example, but not limited to, VISIO® Collaborative Design Interface by Microsoft® and alternatives such as, for example, but not limited to, LucidChart by Lucid Software Inc. and yEd Graph Editor by yWorks), an exemplary interactive procedure execution display GUI environment representing an exemplary system for managing execution automatically of a procedure (procedure overview display), computer function language (automation code), and a document (plain English output and secure execution archive) according to an exemplary embodiment of the disclosed subject matter.

FIG. 5 depicts a composite image 500 representing several aspects of the disclosed subject matter, which can be implemented in a GUI environment. As shown, in an exemplary embodiment, an exemplary graphical procedure documentation system 502 for documenting a procedure graphically (e.g., but not limited to, using an Augmented Manual Procedures™ add-in to VISIO® Collaborative Design Interface available from NovaTech Process Solutions of Owings Mills, Md., U.S.A.) can be used to create a procedure for further use. FIG. 5 represents the exemplary graphical documentation system 502 as a cartoon of a flowchart. Advantageously, a procedure can be documented graphically, and text and associated verb object free-form textual component definitions can be captured. The exemplary graphical procedure documentation system 502 illustrated can provide an exemplary interactive procedure execution display GUI environment 504 representing an exemplary system for managing execution automatically of a procedure through a procedure overview display. The procedure overview adjust procedure steps dynamically according to variables and strings entered by the operator. Operator and/or supervisor authentication and/or comments can be captured for specified steps. The steps of the procedure can be overviewed and displayed in an intuitive hierarchical tree-based expandable-collapsible format. Buttons can be provided for process area selections. Also, the exemplary graphical procedure documentation system 502 can provide computer function language (automation code) 506 to run procedures manually or automatically, including code such as, e.g., but not limited to, in D/3® DCS and/or OPC format for PLCs as well as scripts, for example, but not limited to, Lua scripts, extracted from Visio flowcharts and used to execute steps in DCS/PLC and communicate with other non-PLC plant/system resources. These resources can include plant databases, for example, but not limited to, MES, ERP, LAB and HISTORIAN databases, and Open APIs for communicating with other resources. Finally, exemplary graphical procedure documentation system 502 can provide a document (plain English output and secure execution archive) 508 according to an exemplary embodiment of the disclosed subject matter, allowing automatically generated MICROSOFT® WORD®, or PDF documents to be used for procedure revision, printing, etc. The document can be an unalterable PDF procedure report, which can provide a log, including a timestamp, tracking of authentication, comments captured, etc.

As an example, Table 1 below, illustrates an exemplary embodiment of a common procedure in the process industry, specifically, a tank-to-tank material transfer of hazardous goods. Today the full procedure is roughly 6 typed papers long. (Similar procedures in the process industry can be 20-30 pages long.) Reference the color coding and the Step indexing of the procedure. To facilitate ease of use by the operator, the lengthy procedure can be "chunked" into smaller yet logical actions which can be projected as sequential instructions. Specifically, to accomplish the tasks of chunking the system can provide sequential screen views of digestible portion in a mobile device for the operator. Human behavior analysis indicates maximum 5-7 tasks or instructions per Step are optimal.

Prior to confirming completion of each task a Hold to proceed with automated actions is placed in the automation system. Mobile transmission of permissions is programmatically inserted in the process control schema for each completed task's execution in the correct sequential order is transmitted wirelessly to the control platform. As the manual tasks displayed on the mobile device are acknowledged as being COMPLETE by the operator, a wireless transmission of a permissive is transmitted to the process control system. When the task is complete the mobile field operator acknowledges a question that all conditions are met. In addition, as discussed above, camera evidence of the valve, switch device orientation can be used to verify the correctness of the manual operator actions as they occur, as well as, to identify the status of the equipment being worked on or the process being monitored. This verification and validation activity can be transmitted to the control system. Within the control system application software an interlocking permissive is enabled by the control room operator accepting the field actions and findings. Real-time Alerting of invalid actions using, for example, but not limited to, text, audio, kinesthetic and visual messages can be immediately presented both to the field and control room operators (much like collision detection on an automobile). The software integration of human generated field permissions and automated control schema provides a level of protection not available without significant cost in extra field sensors and actuators.

The AMP checklist application is version controlled and can be deployed on multiple platforms including, for example, but not limited to, non-hardened and industrially hardened smart phones or tablets to displace the non-version controlled crib notes discussed above. Also, the AMP checklist application can be ported to wearable eye glasses or helmets to provide hands-free visualization of chunked logically organized and simplified sequential instructions in a heads-up display manner thus freeing up both operator hands to actually perform the designed task in an uninterrupted manner with no fumbling, e.g., driving a car and texting simultaneously.

TABLE 1

Hazardous Tank Truck Unloading Procedure: Critical/Routine

Scope
This procedure is used by operators to unload a tank truck containing a hazardous chemical
Take Precautions
The table below lists job hazards and the precautions that should be understood
before beginning this procedure.

| Hazard | Precaution |
| --- | --- |
| Potential for exposure to sulfuric acid. Mist or vapors can cause severe eye burns. A short single exposure may cause skin burns. A single brief exposure of easily attainable concentrations can cause death. OSHA PEL is 1 mg/m$^3$ | Wear PPE |
| Be aware of reaching and bending. | Use correct ergonomic positions. |
| Be aware of moving vehicles. | Be sure truck engine is off, keys removed, brakes are set and wheels chocked. Warning lights should be on at truck station. Put 'person working sign' on truck door driver's side. |
| Potential for spills. | Be sure all connections are made correctly. Visually check whole truck for proper valve seals, caps on and bolts on dome are tight. Wash down exterior if needed. |
| HOLD Procedure Condition If any physical contact or exposure occurs, immediately enter and use the nearest safety shower. Continue Procedure | Acknowledge understanding with a YES |

Tools Required
The tools and equipment listed below are needed to do this job.

| Tools and/or Equipment | Use (if explanation is needed) |
| --- | --- |
| Proper PPE. | Refer to PPE hazard grid posted in the control room. |
| Unloading checklist. | The procedure checklist must be printed and completed. |
| Walkway and safety rail. | The walkway and safety rail must be lowered from the platform. |

TABLE 1-continued

| Hazardous Tank Truck Unloading Procedure: Critical/Routine | |
|---|---|
| Paperwork | Tank Truck inspection record and Bill of Lading |
| Hammer | Used to tighten connections. |
| HOLD Procedure | |
| Condition | Acknowledge understanding with a YES |
| Have you procured the appropriate equipment to perform the job safety? | |
| Continue Procedure | |

| Review Consequences of Deviation | |
|---|---|
| Type of Deviation | Consequences and How to Avoid |
| Not wearing PPE. | Could result in exposure to sulfuric acid. Refer to the PPE Hazardous Material Grid posted in the control room. |
| Not checking valve connections. | Could result in leaks. Be sure to check all connections as required in the procedure checklist. |
| Driver entering truck while unloading | Could start truck and move ahead. Be sure to take driver's keys. |
| Not getting the driver's keys | Driver could enter truck and move the truck forward. Be sure to take keys. |
| HOLD Procedure | |
| Condition | Acknowledge understanding with a YES |
| Have you reviewed and do you understand the hazards and consequences of not following this procedure? | |
| Continue Procedure | |

Chemical Unloading
Operators follow these steps to unload hazardous material from tank trucks.

| Step | Action (and Hazard/Precaution if applicable) | Check |
|---|---|---|
| 1 | TURN the truck engine OFF<br>SET parking brakes<br>GET keys from driver | |
| 2 | GET certificate of analysis from truck driver.<br>CHECK that the truck has 3 seals?<br>CONDITION<br>If not do not unload and notify scheduler<br>CHECK that the analysis is in spec? (97-99.5%)<br>CONDITION<br>If not, do not unload and notify scheduler | |
| 3 | CHECK thant the warning lights are on at truck station (should be automatic). | |
| 4 | HOLD Procedure | |
| 5 | VERIFY the following with control room:<br>SET Parameter (100) value to 99 = Material ID<br>CHECK Acid tank can hold amount of load.<br>Alarm (145) is not true.<br>SET Parameter (99) value to 1. = Proceed<br>NOTE<br>(This should make Analog Calculated value = 99 representing the unloading 99% acid truck.) | |
| 6 | CONTINUE Procedure | |
| 7 | CHECK safety showers and eye baths function | |
| 8 | PLACE 'people working sign' on driver door or trailer jack<br>CHOCK wheels. | |
| 9 | VERIFY that camera in control building is operational.<br>CHECK that tractor is removed from trailer and leaves the battery limits. | |
| 10 | LOWER platform walkway & safety rail. | |
| 11 | CLOSE both truck valves are closed.<br>REMOVE the valve seals.<br>UNCAP truck unloading line<br>CHECK that the o-rings are not cracked. | |
| 12 | HOLD Procedure | |
| 13 | CONDITION<br>If they are cracked . . . replace them prior to unloading.<br>NOTE<br>Unloading line is located at rear of tanktruck | |
| 14 | CONTINUE Procedure | |
| 15 | POSITION oleum acid unload line from the north side of the truck<br>CONNECT to the truck. | |

TABLE 1-continued

Hazardous Tank Truck Unloading Procedure: Critical/Routine

|  |  |
|---|---|
|  | OPEN truck and flexhose unloading line valves. |
|  | OPEN manual valve on air line. |
| 16 | HOLD Procedure |
| 17 | CONDITION |
|  | If vent valve is not located at the top of ladder, driver must move trailer so the vent valve can be reached from the overhead platform. |
|  | UNCAP truck vent line |
|  | CHECK that the gaskets are not cracked. |
|  | CONDITION |
|  | If they are cracked, then |
|  | REPLACE gaskets them prior to unloading. |
|  | NOTE |
|  | The vent lines are the most forward connection on the tank truck. |
| 18 | CONTINUE Procedure |
| 19 | POSITION vent line from front side of the truck |
|  | CONNECT connect vent line to the truck. |
|  | OPEN truck and flexhose vent line valves. |
| 20 | CONNECT air hose to truck at rear of truck |
|  | CHECK that truck bleed valve is CLOSED |
| 21 | HOLD Procedure |
| 22 | CONDITION |
|  | Relocate operator to remote shanty prior to starting transfer |
|  | PRESS proximity acknowledgement switch in acid shanty. |
|  | SET permissive to enable start offloading. |
|  | NOTE |
|  | (will take 30 seconds to start) |
| 23 | CONTINUE Procedure |
| 24 | OBSERVE offload connections for leaks during transfer |
|  | OBSERVE pressure on transfer pump |
|  | OBSERVE level in receiving tank |
|  | OBSERVE presence of personnel in adjacent areas. |
| 25 | CONDITION |
|  | IF there is a leak, spill, person in trouble, line or pump failure, |
|  | PUSH the EMERGENCY STOP button in the acid shanty and notify control room via phone of situation and request assistance |
|  | To Clear the Emergency, |
|  | GO to Step 22 to restart transfer |
| 26 | COMPLETE Tank Truck inspection Record while transfer is progressing |
| 27 | CHECK unloading is complete based on pump pressure |
|  | PERFORM the following calculation and verify: |
|  | Initial wt. of truck (from drivers ticket) |
|  | _____ lbs. |
|  | Weight of truck after unloading |
|  | _____ lbs. |
|  | Weight of unloaded material (subtract) |
|  | _____ lbs. |
| 28 | HOLD Procedure |
| 29 | CONDITION |
|  | IF calculated Weight unloaded is not within the range of 48M-52M lb THEN Contact scheduler for disposition |
|  | Else PROCEED to disconnect the transfer hoses from the Tank Truck. |
| 30 | CONTINUE Procedure |
| 31 | PREPARE to disconnect truck: |
|  | CHECK truck pressure is <1 psig before disconnecting lines (gauge just outside shanty) |
|  | CLOSE air supply valve truck air valves. |
|  | DISCONNECT air line from rear of truck. |
| 32 | CLOSE unload line valves on unloading line |
|  | CLOSE unload line valves on flexhose |
|  | CLOSE unload line valves truck |
|  | NOTE |
|  | (most REAR truck connection.) |
|  | DISCONNECT unloading line from truck. |
|  | CAP truck unloading line. |

| Step | Action (and Hazard/Precaution if applicable) | Initials |
|---|---|---|
| 33 | CLOSE vent line valves on vent line | |
|  | CLOSE vent line valves on flexhose | |
|  | CLOSE vent line valves on truck | |
|  | NOTE | |
|  | (most FORWARD truck connection.) | |
|  | DISCONNECT vent line from truck. | |
|  | CAP truck vent line. | |
| 34 | HOLD Procedure | |

TABLE 1-continued

Hazardous Tank Truck Unloading Procedure: Critical/Routine

35  VISUALLY Inspect whole truck for:
    proper valve seals,
    caps are on,
    bolts on dome are tight.
    Wash exterior contamination, if needed.
    CONDITION
    For any spill other than massive failure of the tank truck,
    WASH & dilute spill with water and flush to sewer.
    CONDITION
    If spill is in the top of the tank truck where unloading and vent
    lines are hooked up,
    VERIFY that valves on truck are closed before flushing with
    water to prevent water from entering tank truck.
36  CONTINUE Procedure
37  REPOSITION unloading and vent lines to the catch funnels
    PULL AWAY walkway & safety rails.
38  ATTACH Bill of Lading & weigh ticket.
    FILE completed check sheet in control room.
39  END of Procedure The goal of exemplary embodiments of the disclosed subject matter is to drive operational performance through consistent procedural execution. An embodiment of the disclosed subject matter is a platform-neutral procedural automation solution which strikes the balance between manual and fully automated procedures. Unlike other similar packages, the embodiment of the disclosed subject matter interacts with the control system in real-time, ensuring accurate capture of data, including remote field information without the need of electronically connected devices and timely execution of procedure steps.

Abnormal events in the process industries rarely have a single cause. In most, if not all, cases, a combination of factors comes together resulting in an unplanned event. Addressing these multiple factors in an integrated manner requires first evaluating the sources or root causes at the points of failure. The process itself is the lowest cause of points of failure at 26 percent, while equipment used in the process are the cause of problems 36 percent of the time, and inappropriate human action is the primary cause in 42 percent of the cases and human actions were also noted as a secondary contributing cause in over 80 percent of the cases. Given these results, why do operators not follow procedures? Table 2 summarizes some of the reasons.

TABLE 2

| Procedures are not used because . . . | | Percent Agreeing |
|---|---|---|
| Accuracy | . . . they are inaccurate | 21% |
|  | . . . they are out-of-date | 45% |
| Practicality | . . . they are unworkable in practice | 40% |
|  | . . . they make it more difficult to do the work | 42% |
|  | . . . they are too restrictive | 48% |
|  | . . . too time consuming | 44% |
|  | . . . if they were followed "to the letter" the job couldn't get done in time | 62% |
| Optimisation | . . . people usually find a better way of doing the job | 42% |
|  | . . . they do not describe the best way to carry out the work | 48% |
| Presentation | . . . it is difficult to know which is the right procedure | 32% |
|  | . . . they are too complex and difficult to use | 42% |
|  | . . . it is difficult to find the information you need within the procedure | 48% |

TABLE 2-continued

| Procedures are not used because . . . | | Percent Agreeing |
|---|---|---|
| Accessibility | . . . it is difficult to locate the right procedure | 50% |
|  | . . . people are not aware that a procedure exists for the job they are doing | 57% |
| Policy | . . . people do not understand why they are necessary | 40% |
|  | . . . no clear policy on when they should be used | 37% |
| Usage | . . . experienced people don't need them | 19% |
|  | . . . people resent being told how to do their job | 34% |
|  | . . . people prefer to rely on their own skills and experience | 72% |
|  | . . . people assume they know what is in the procedure | 70% |

Source:
(http://www.humanreliability.com/articles/
Consensus%20based%20Approach%20to%20Risk%20MANagement.pdf)

One way to reduce human factors errors is by integrating Standard Operation Procedures (SOPs) with Automation. SOPs represent a significant intellectual investment and can be a source of both competitive advantage as a result of improved levels of operational performance . . . when they are followed. Unfortunately, there are many reasons why they are not.

The solution presented in the disclosed subject matter provides the necessary compromise between manual and fully automated procedures in an operations-friendly manner to enable higher levels of consistent performance at an affordable cost. For example, in embodiments of the disclosed subject matter, overview displays are used to train operators on existing procedures producing consistent results and ensuring safe and efficient plant operation under all operating conditions. Exemplary embodiments of the disclosed subject matter provide an engineering graphical interface which is conformant to ISA-88 configuration standards for the accurate and validated creation of an SOP. New procedures can be easily created, version controlled and issued on an enterprise wide basis. The exemplary embodiments of the disclosed subject matter also provide an operator friendly, real-time SOP display which guides the operator through the procedure employing a "proven-in-use" checklist format in the natural language of choice. In addition, the exemplary embodiments of the disclosed subject matter are platform neutral and can run standalone or in conjunction with any control system through OPC connectivity.

The power of SOP's is greatly magnified when they become the operator's daily window into the process. By implementing computer augmented manual procedures integrated with the process automation system, human variability can be mitigated resulting in more consistent execution as per the specified design intent. In exemplary embodiments of the disclose subject matter, procedures can be implemented for both routine and non-routine tasks to address planned and unplanned activities. Routine procedures such as recurring process line-ups, cleaning, rounds and inspections can be configured in the procedures to ensure human execution consistency and compliance. Non-routine procedures typically due to abnormal events can also be set-up to guide an operator through a successful mitigation a deviating process condition.

A typical example is a layer of protection analysis, i.e., an operator response to an alarm condition. When computerized alarms are activated, the operator is directed to an implemented procedure that presents the operator with the proper steps to take to correct the problem. Completed procedures are converted to secure, time-stamped PDFs for record retentions and compliance requirements.

Today, bridging the gap between outgoing, experienced personnel and new operators is a constant challenge for plant managers. An exemplary embodiment of the disclosed subject can provide an excellent training tool to transfer and validate knowledge between personnel, because the implemented procedures can be used to simulate manual task execution, and, in conjunction with the process control system, provide a vehicle for periodic review and change management compliance.

Essentially, augmented manual procedures become an integral part of an operator's daily routine integrating the best attributes of man-machine-methods. With augmented manual procedures implemented, management can be assured that all operators are proficient in their assigned manual tasks with an automated audit trail and procedural interlocking (two level review) to ensure consistent, safe, and efficient process operation.

An exemplary embodiment of the disclosed subject matter augmented manual procedure is the shortest and most cost effective path to operational consistency. The exemplary embodiment of the disclosed subject matter augmented manual procedure is platform independent that simplifies the creation, execution and maintenance of SOPs across an entire process enterprise.

Designed from a procedural automation point of view, the exemplary embodiment of the disclosed subject matter augmented manual procedure manages the procedure lifecycle digitally to provide a consistent, version controlled and validated operating procedures consistent with the expectations of OSHA PSM.

Using an intuitive object palette built into Microsoft Visio, operators and engineers can collaborate quickly and accurately to capture best practices and industry knowledge to develop SOPs in an industry recognized and structured manner. A benefit here is that Visio drawings in an ISA 88 format, Sequential Function Charts allows the engineer to logically validate the procedure correctness and test/simulate its utility with operator feedback. Today many written SOPs lack a rigorous method of validating the new or modified procedure before deploying in the field.

In the exemplary embodiment of the disclosed subject matter augmented manual procedure, these Visio objects (see FIG. 3B) automatically generate written SOPs, with an operator's dynamic checklist interface and automation code for interlocking manual procedural tasks with automated process control schema.

The integration of human and automated procedural execution provides the checks and balances required to reduce and/or eliminate human error (acts of omission or commission), thus improving operational consistency. Because everything is managed electronically, users are assured that every procedure is executed with the latest approved revision. An analogy in the Pharma industry is to "electronic batch records" where an exemplary embodiment of the disclosed subject matter provides a step by step confirmation and record of procedural execution with interlocking to ensure consistent and repeatable operator execution of manual tasks.

By generating hardcopy and PDF SOPs from the structured environment of Visio, there is no chance of a missed or forgotten steps—everything has to connect. The layout and location of information is kept uniform and standardized (AICHE recommended format) across revisions, allowing staff to quickly navigate the procedure in real-time or historically to troubleshoot and continuously improve procedural execution.

In an exemplary embodiment of the disclosed subject matter, the procedure overview display is the operator preferred window into the process using a checklist style display format, which allows for scheduling, running and debugging running procedures. The real-time interaction between the executing SOP and the control system ensures accurate capture of data and timely execution of procedure steps. Alarm or emergency conditions can trigger Alarm Response Procedures, providing accurate information in a timely manner . . . when it is needed most.

Written SOPs are an effective way to transfer best practices and industry know-how across shifts, geographies and generations. In SOPs developed using exemplary embodiments of the disclosed subject matter become the most current and best practice operating discipline and are reinforced daily with every executed procedural step. Whether a given procedure is new or just new to a specific operator, the training is continuous.

The executed record of a completed procedure is securely archived including tasks completed, timestamps of each task, relevant operating parameters, equipment status, and operator comments, which make the records suitable submissions for regulatory compliance.

Figure 6A:
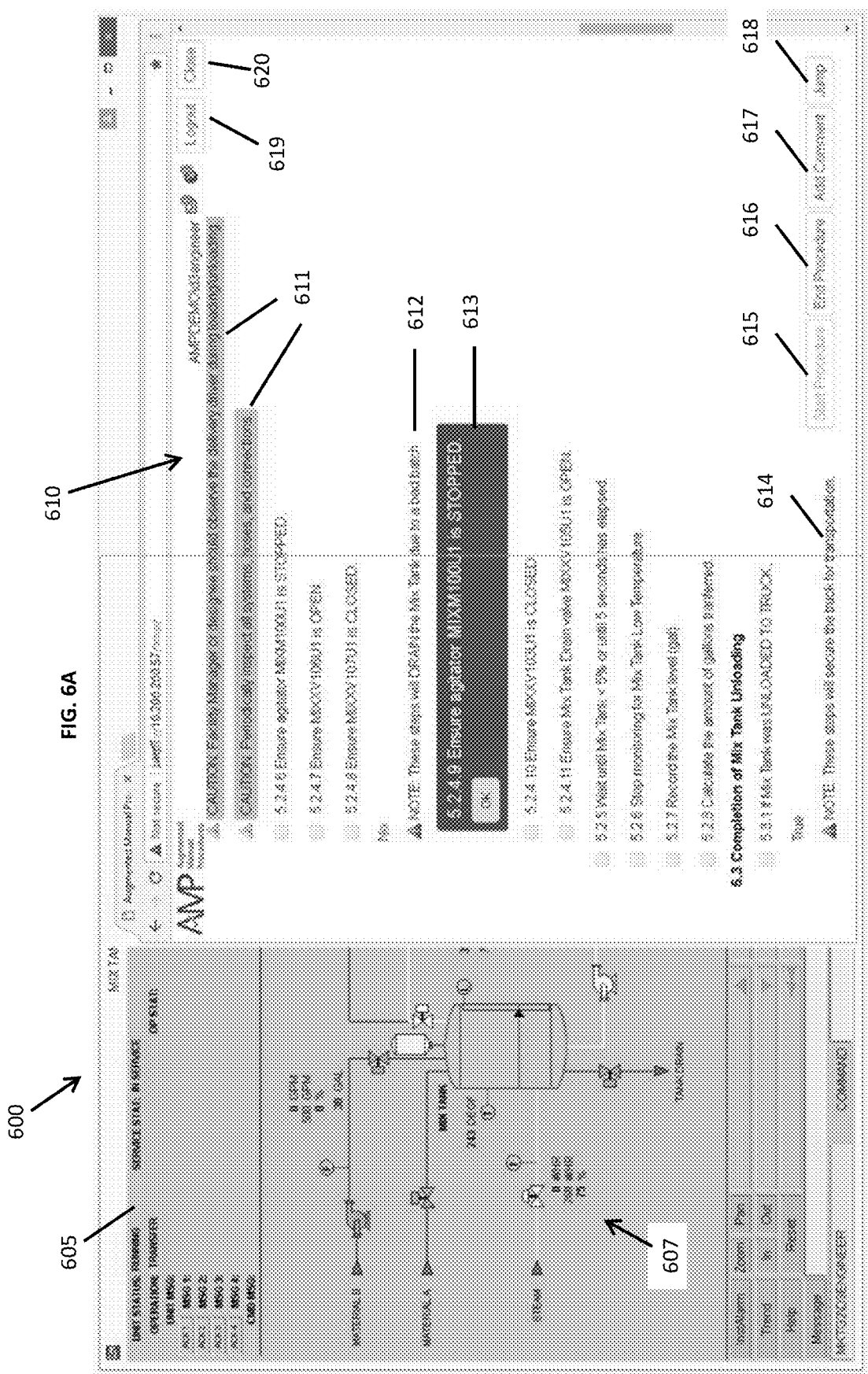
FIGS. 6A-6D illustrate a portion of an execution of a procedure for unloading a mix tank being executed in a GUI and that was developed using an exemplary embodiment of the disclosed subject matter as displayed for an operator according to an exemplary embodiment of the disclosed subject matter.

FIGS. 6A-6D illustrate a portion of an execution of a procedure for unloading a mix tank being executed in a GUI and that was developed using an exemplary embodiment of the disclosed subject matter as displayed for an operator according to an exemplary embodiment of the disclosed subject matter. In FIG. 6A, a GUI screen display 600 includes a system diagram screen 605 that displays the components of a system, connections between the components and real-time status of a system 607 for which a procedure in the procedure screen 610 is being executed. It should be understood that the GUI screen display 600 can be implemented on stationary including, for example, but not limited to, desktop computers, as well as mobile computing platforms including, for example, but not limited to, laptop computers, tablet computers, PDAs and the like. As seen in the procedure screen 610, step-by-step instructions for the system 607 are displayed and scroll upward from a bottom of the GUI screen display 600. Two caution notices 611 are seen highlighted in yellow and a triangular yellow sign followed by the word CAUTION at the top of the GUI screen display 600 and a first Note 612 is seen highlighted by a triangular blue sign followed by the word NOTE. A currently executing procedure step 613 is identified as 5.2.4.9 and seen in an enlarged font and highlighted in blue that is requesting an operator input to verify that the agitator is stopped. A second Note 614 is also seen highlighted by a triangular blue sign followed by the word NOTE at the bottom of the GUI screen display 600. Immediately to the right of the bottom second Note 614 are positioned 4 control buttons, a Start Procedure button 615 to start the procedure, an End Procedure button 616 to stop/end the procedure, an Add Comment button 617 to permit an operator to add a comment to the record of execution at a certain point, and a Jump button 618 to jump to a specific location in the procedure. In addition, in a top right corner of the GUI screen display 600 are a Logout button 619 for operators to log out of the program and a Close button 620 for operators to log out of and close the system.

Figure 6B:
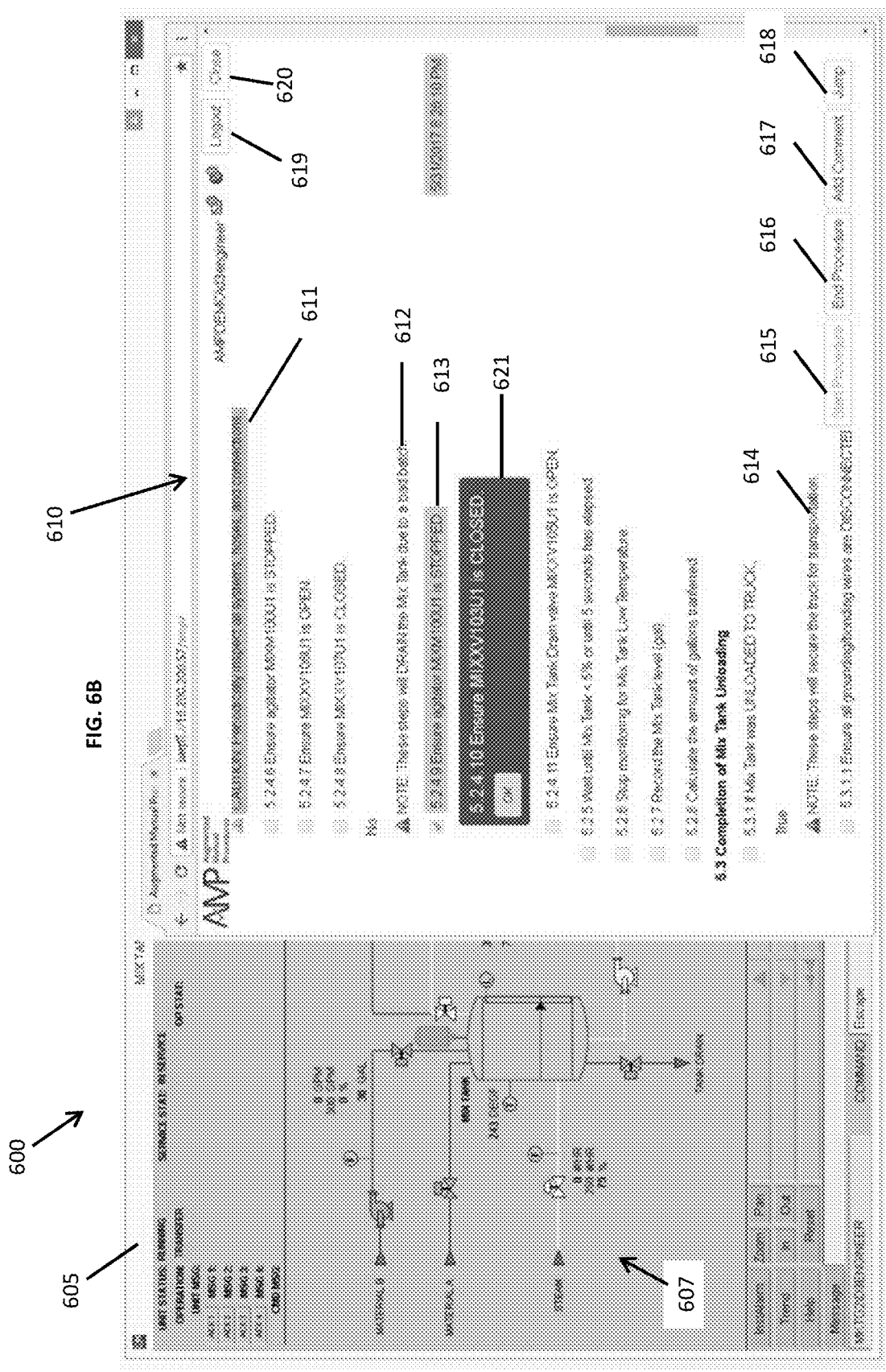
Figure 6C:
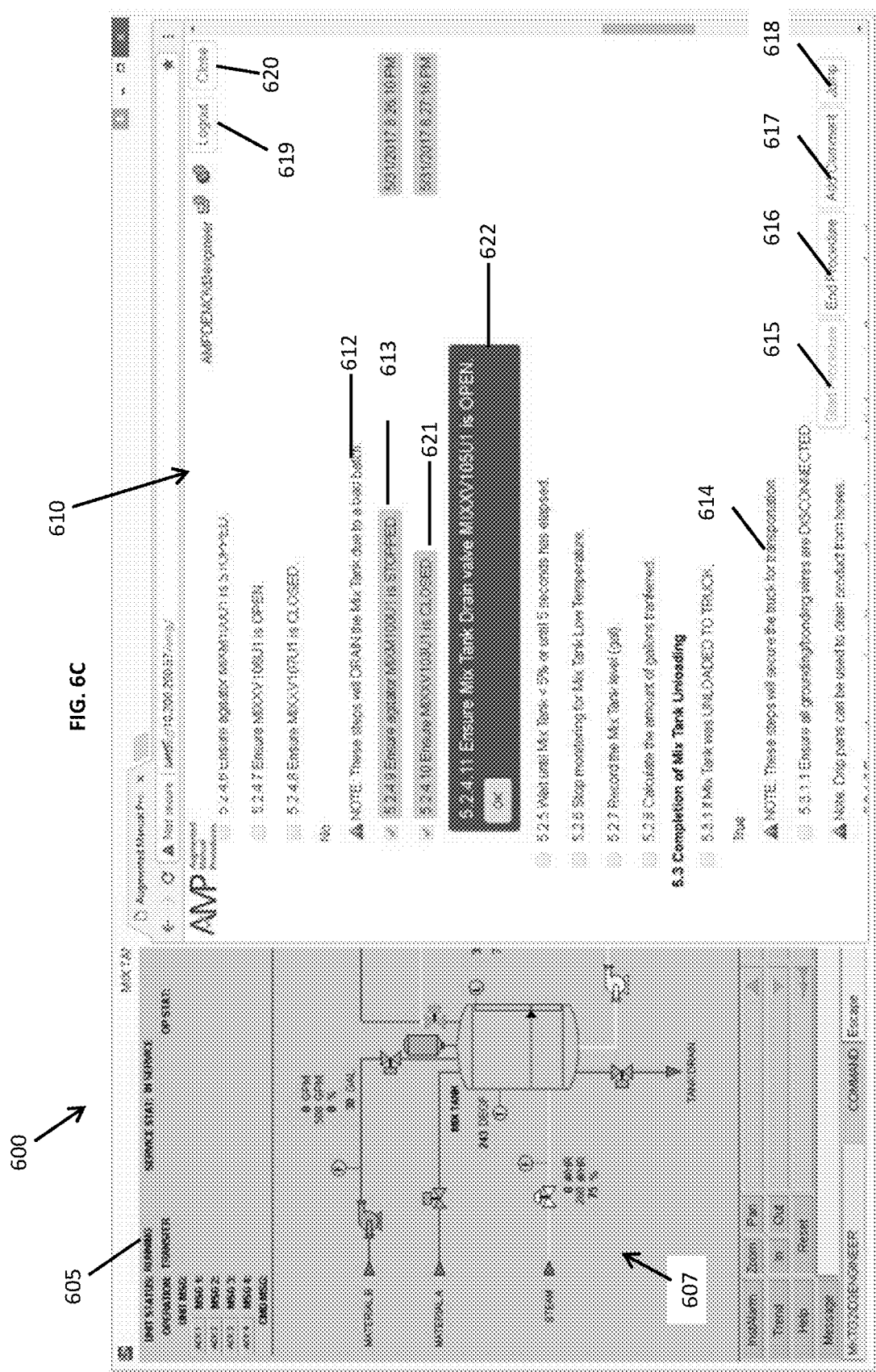
Figure 6D:
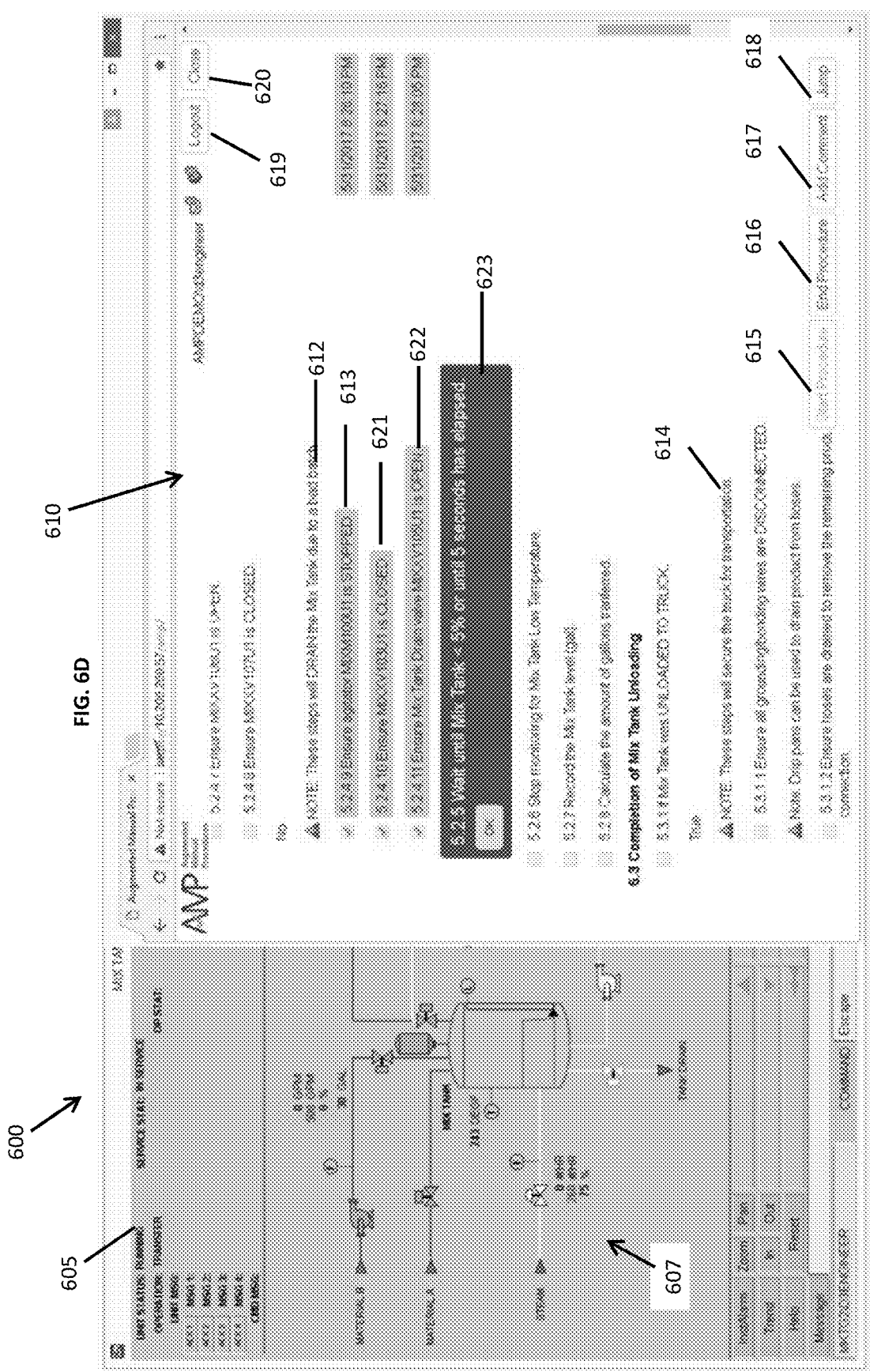

In FIG. 6B, the GUI screen display 600 from FIG. 6A has scrolled up one line to show a new last line, is showing the currently executing procedure step 613 from FIG. 6A in a normal size font and highlighted in gray. A new currently executing procedure step 621 is identified as 5.2.4.10 and seen in an enlarged font and highlighted in blue that is requesting an operator input to verify that mix valve is closed before proceeding. In FIG. 6C, the GUI screen display 600 from FIG. 6B has scrolled up one more line to show a new last line, is showing the currently executing procedure step 614 from FIG. 6B in a normal size font and highlighted in gray. A new currently executing procedure step 622 is identified as 5.2.4.11 and seen in an enlarged font and highlighted in blue that is requesting an operator input to verify that mix valve is closed before proceeding. In FIG. 6D, the GUI screen display 600 from FIG. 6C has scrolled up one more line to show a new last line, is showing the currently executing procedure step 622 from FIG. 6C in a normal size font and highlighted in gray. A new currently executing procedure step 623 is identified as 5.2.5 and seen in an enlarged font and highlighted in blue that is requesting an operator input to verify that the mix tank is 5% or less full or 5 seconds has elapsed before proceeding.

Figure 7:
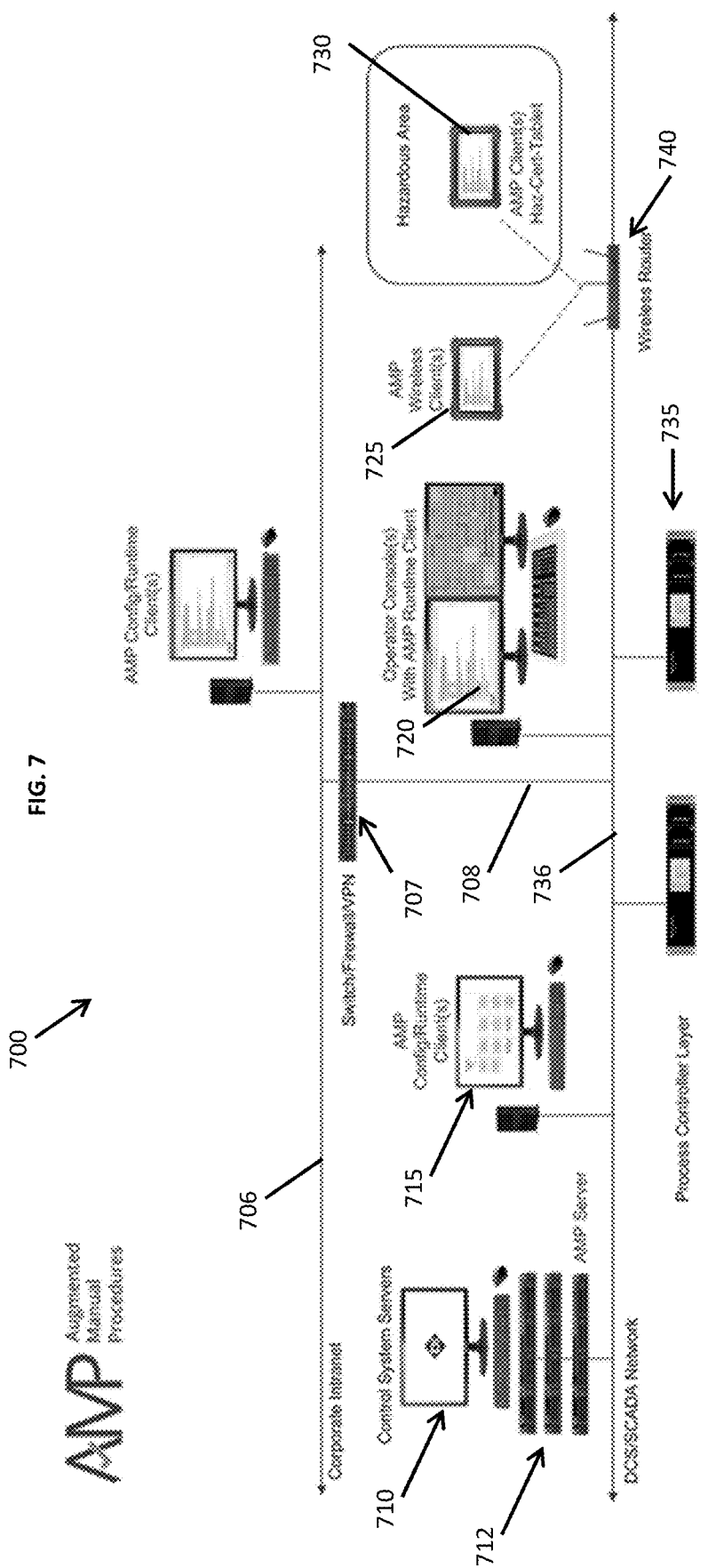
FIG. 7 is a typical network architecture in which an exemplary embodiment of the presently disclosed subject matter can be implemented.

FIG. 7 is a system diagram of an exemplary embodiment of the presently disclosed subject matter. In FIG. 7, a computer network system 700 includes one or more config/run time clients 705 that can be used to create, i.e., configure, the procedures as well as run the procedures. The one or more config/run time clients 705 can be coupled to a corporate network 706 on which the procedures can be configured and run, which in turn can be coupled through a switch/firewall/VPN and across a connecting network to a DCS/SCADA network 736. Connected to the DCS/SCADA network 736 are one or more servers 712 to which can be connected a control system server 710. Additional config/runtime clients 715 can be coupled to the DCS/SCADA network 736. One or more operator consoles with a runtime client 720 and a process controller layer 735 are also connected to the DCS/SCADA network 736. At least one wireless router 740 is coupled to the DCS/SCADA network 736 to enable wireless communications with one or more wireless client devices 725 and one or more client Haz-Cert tablets 730 for use in hazardous environment areas.

FIG. 8 is a flowchart 800 of an execution flow showing the real-time interlocking functionality between a control system on which an automated sequence is executing and an exemplary embodiment of the disclosed subject matter in which a manual operator input is required. In FIG. 8, the control system automated sequence starts 810 and an automated sequence is executed 820 until a manual operator action is required 830. An OPC call 835 is sent to the exemplary embodiment of the disclosed subject matter to add 840 a procedure to an operator's queue for action. The operator start and eventually executes and signs off 850 on the completed procedure and another OPC call 855 is sent back to the control system where an operator acknowledges and approves the manual results and then the control system continues executing 870 the automated sequence, which, for example, can include looping back to executing 820 the automated sequence, so additional manual operator actions can be required 830 and performed. The automated sequence can eventually stop executing and end 880.

FIG. 9 is a flowchart 900 of an execution flow showing the real-time interlocking functionality between an exemplary embodiment of the disclosed subject matter on which a procedure is executing and a control system from which an automated instruction execution is required. In FIG. 9, the procedure starts 910 and steps are executed 920 until an automated control system action is required 930. An OPC call 935 is sent from the exemplary embodiment of the disclosed subject matter to a control system that receives 940 an instruction from a procedure. The control system eventually executes 950 the instruction and another OPC call 955 is sent back to the exemplary embodiment of the disclosed subject matter that is waiting to receive the OPC call 955 from the control system. The procedure continues executing 970, which, for example, can include looping back to executing 920 the procedure, so additional automated actions can be required 930 and performed. Once all steps are executed the procedure ends 980.

Figure 10:
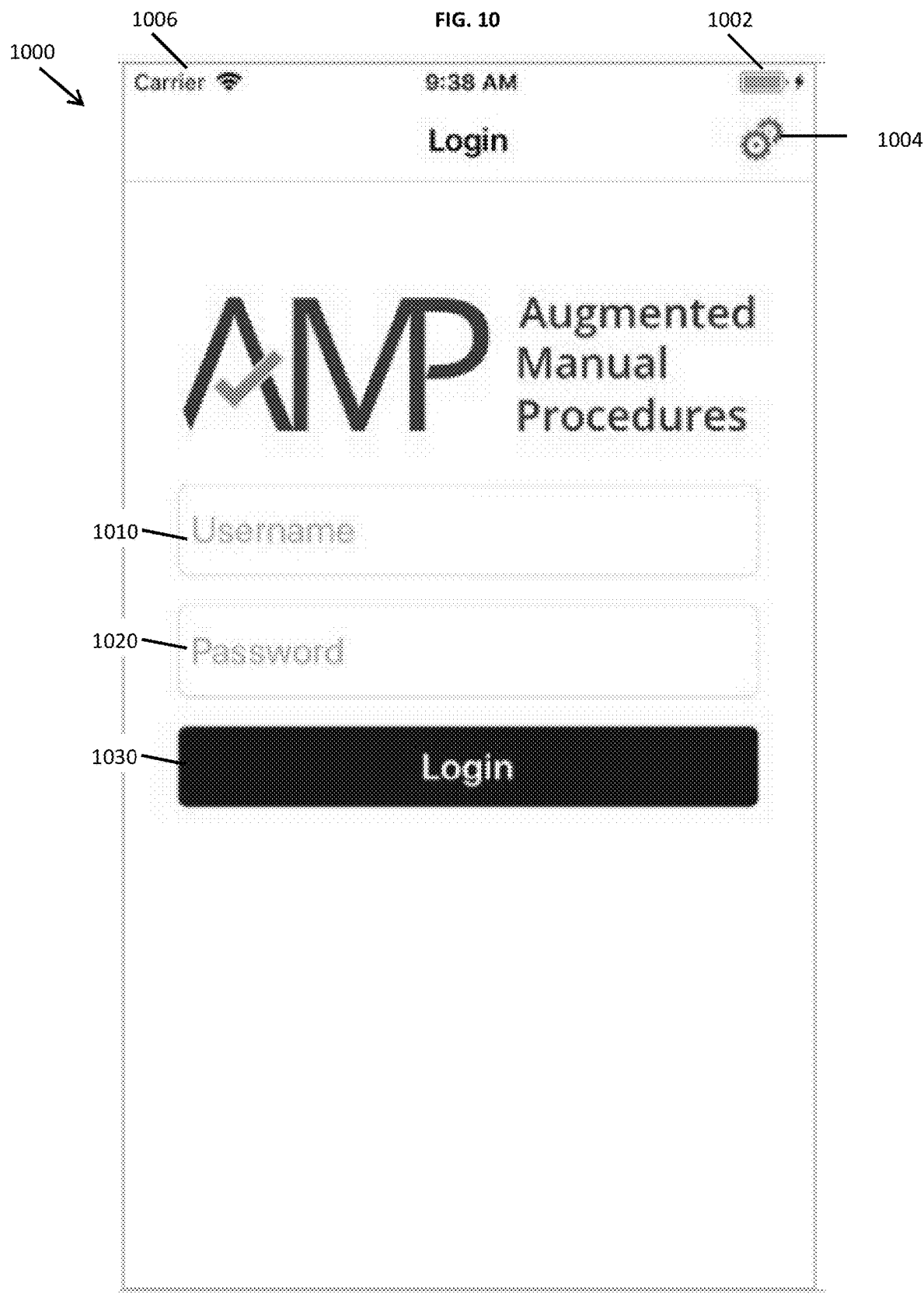
FIG. 10 is an exemplary embodiment of a GUI login display for a mobile device of the disclosed subject matter.

FIG. 10 is an exemplary embodiment of a GUI login display for a mobile device of the disclosed subject matter. In FIG. 10, a login screen 1000 is seen to include a username entry block 1010 for entry of the user's name, a password entry block 1020 for entry of the user's password; and a login button 1030 to submit the username and password for verification and approval. A battery charge indicator 1002 is located in an upper right hand corner. A pair of overlapping gears 1004 is shown immediately below the battery strength indicator 1002 and provides access to the Configuration section of the mobile app shown in FIG. 11, and a carrier signal strength indicator 1006 is located in an upper left hand corner.

Figure 11:
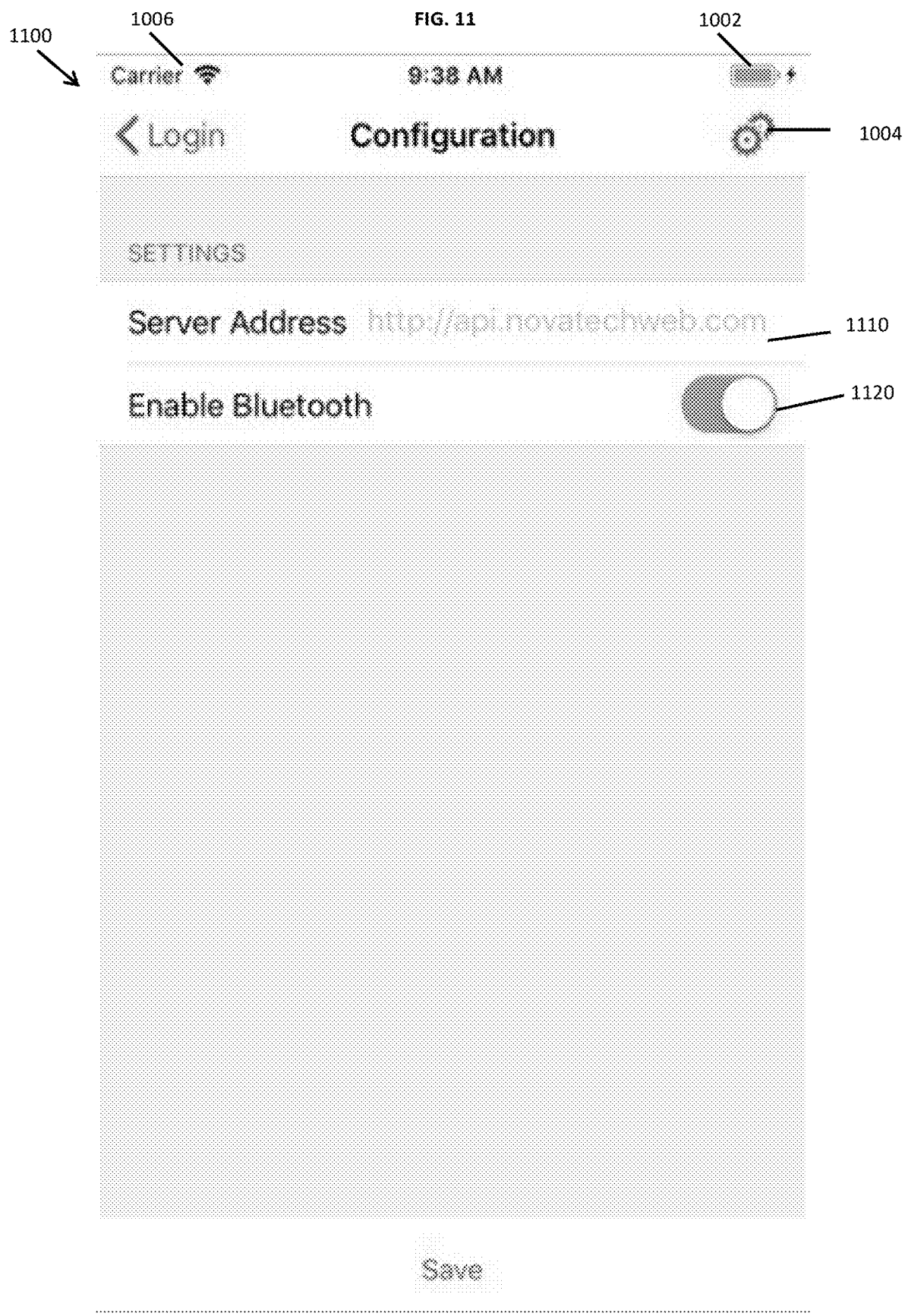
FIG. 11 is an exemplary embodiment of a GUI configuration screen display for a mobile device of the disclosed subject matter.

FIG. 11 is an exemplary embodiment of a GUI configuration screen display for a mobile device of the disclosed subject matter. In FIG. 11, a configuration screen 1100 is seen to include a Server Address entry block 1110 for entry of the server's URL address, and an enable Bluetooth switch 1120 to either enable or disable the use of Bluetooth.

Figure 12:
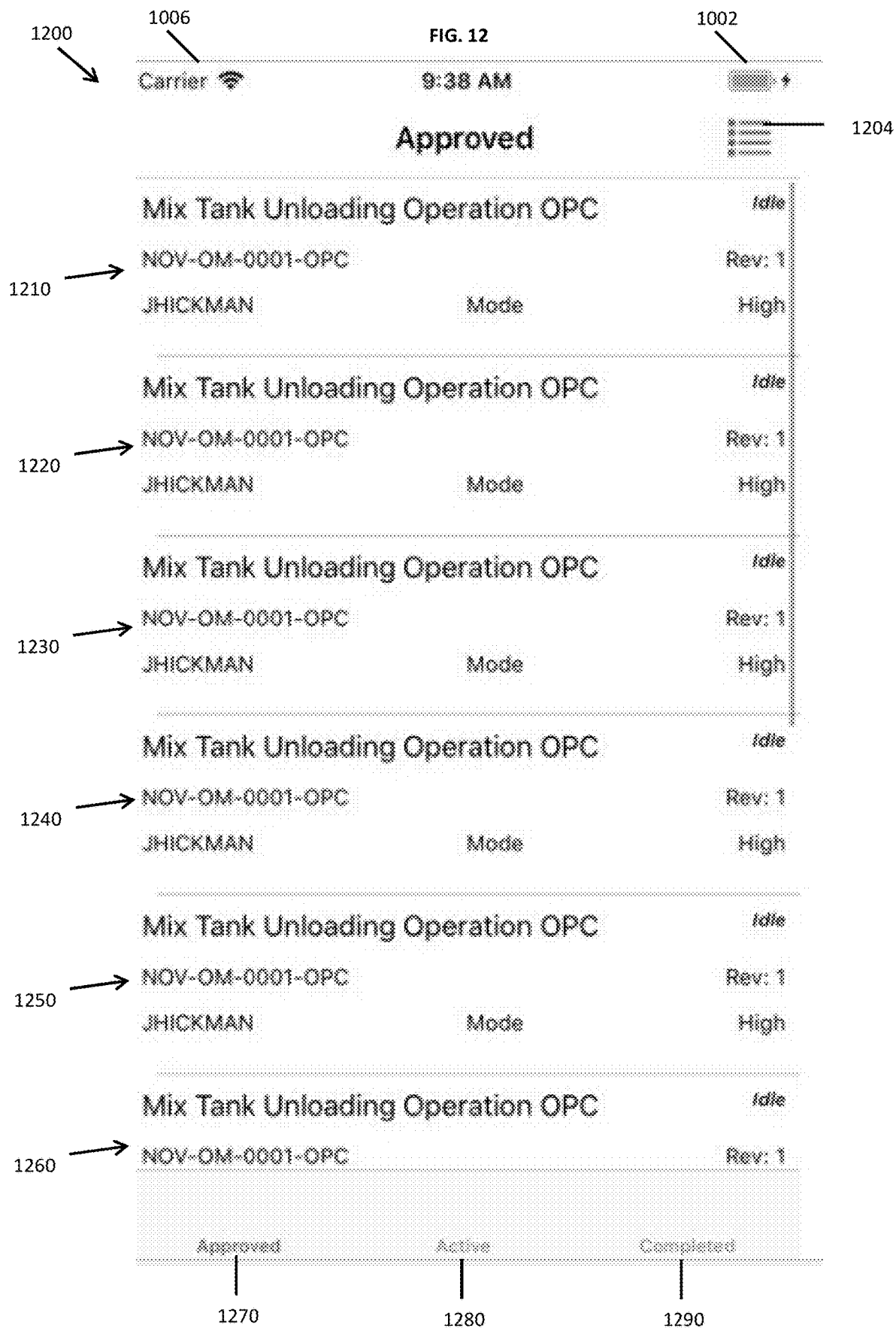
FIG. 12 is an exemplary embodiment of a GUI procedure screen display for a mobile device of the disclosed subject matter.

FIG. 12 is an exemplary embodiment of a GUI procedure screen display for a mobile device of the disclosed subject matter. In FIG. 12, a procedure screen 1200 is seen to include multiple approved procedures 1210, 1220, 1230, 1240, 1250, and 1260, although more are contemplated and possible. An active list icon 1204 is shown in the upper right hand corner below the battery strength indicator 1002. Three status update buttons, an Approved button 1270, an Active button 1280, and a Completed button 1290 are located at a bottom of the procedure screen 1200.

Figure 13:
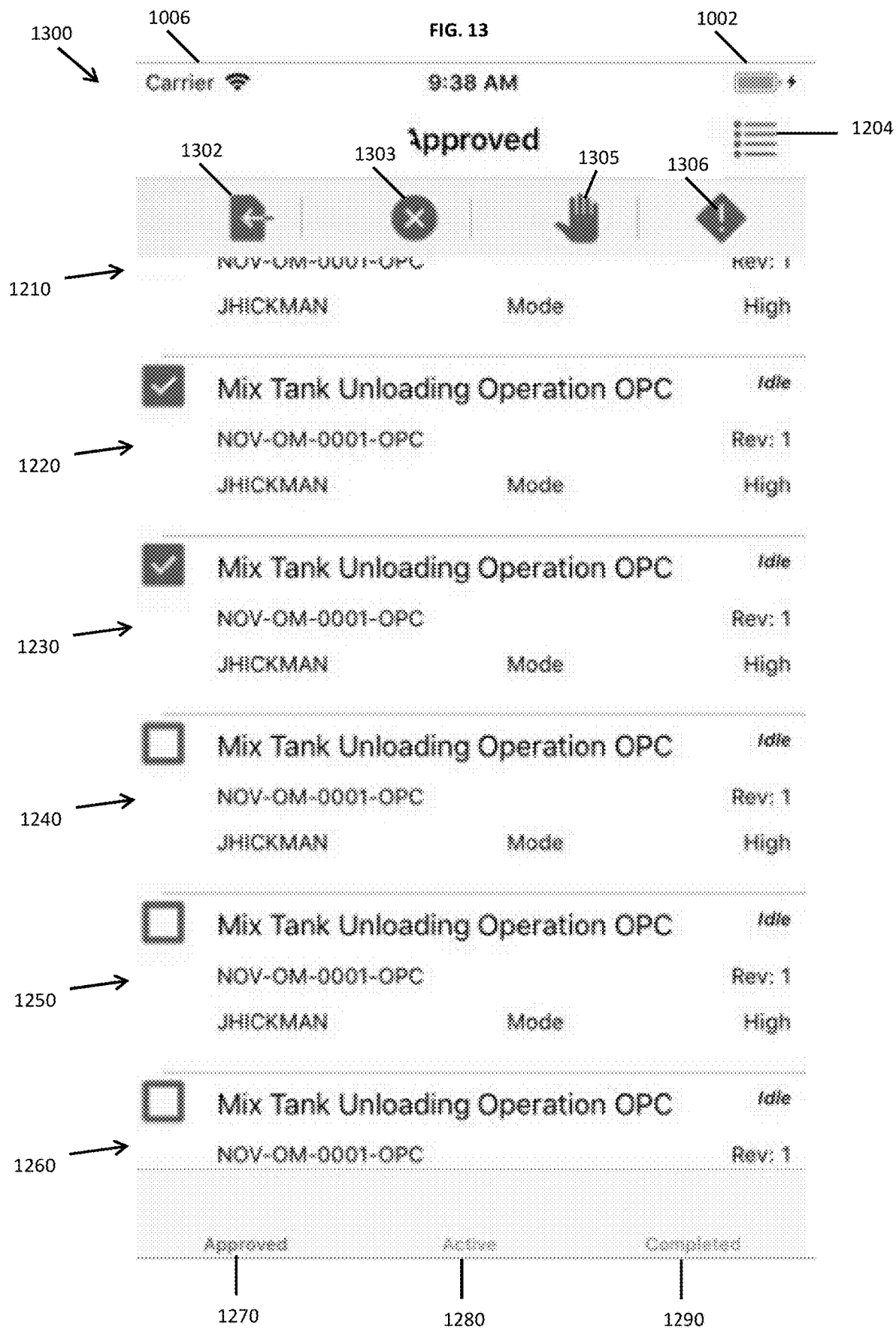
FIG. 13 is an exemplary embodiment of a partially completed GUI procedure screen display from FIG. 12 for a mobile device of the disclosed subject matter.

FIG. 13 is an exemplary embodiment of a partially completed GUI procedure screen display from FIG. 12 for a mobile device of the disclosed subject matter. In FIG. 13, a procedure screen 1300 is seen to include the multiple approved procedures 1210, 1220, 1230, 1240, 1250, and 1260, although more are contemplated and possible. Procedures 1220 and 1230 are shown with a "check mark" on their left sides as an indication of completed status for those procedures. An overlay of four icons, a page with arrow 1302, a circle with an X in the middle 1303, an open hand 1305 and a sign with an "!" 1306 located at a top of the procedure screen 1300 over part of the first approve procedure 1210.

Figure 14:
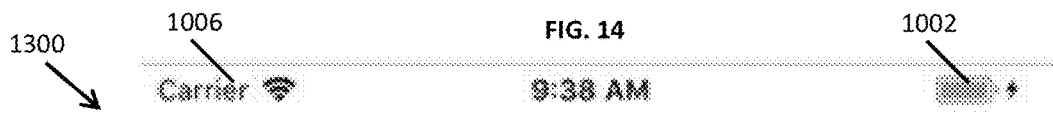
FIG. 14 is an exemplary embodiment of a partially completed step-by-step process GUI procedure screen display for a mobile device of the disclosed subject matter.

FIG. 14 is an exemplary embodiment of a partially completed step-by-step process GUI procedure screen display for a mobile device of the disclosed subject matter. In FIG. 14, a step-by-step process procedure screen 1300 is seen to include multiple steps 1410, 1420, 1421, 1422, 1430, 1440, 1441, 1442, 1443, 1444, 1450, and 1451, although more are contemplated and possible. On a right hand side of each of steps 1410, 1420, and 1421 is a complete status indicator, 1410*a*, 1420*a*, and 1421*a*, respectively.

Figure 15:
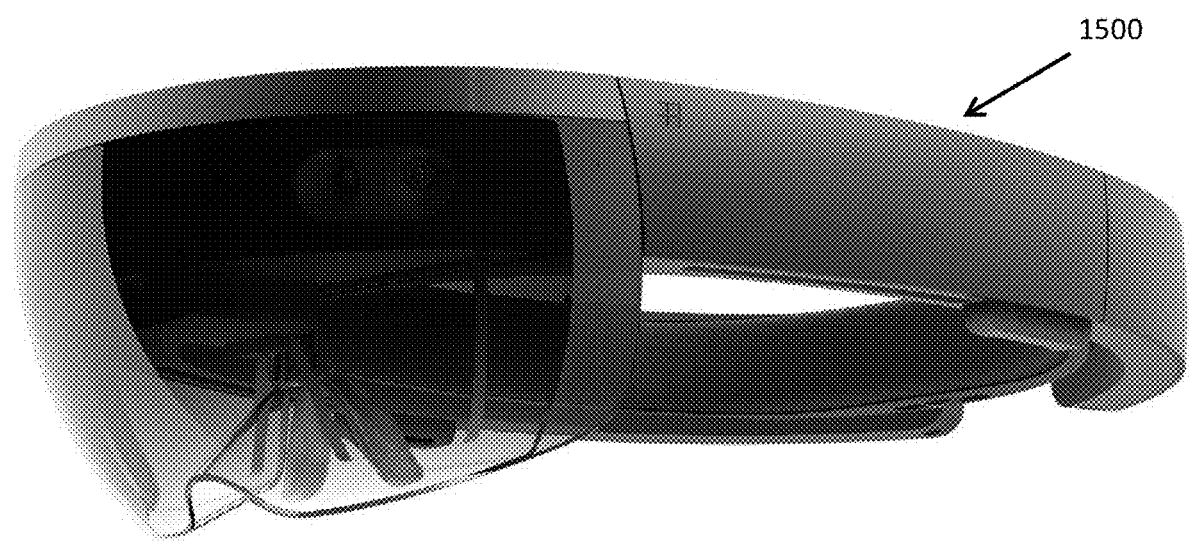
FIG. 15 is an exemplary embodiment of a pair of holographic glasses that may be used by operators with exemplary embodiments of the disclosed subject matter.

FIG. 15 is an exemplary embodiment of one pair of holographic (or augmented reality) glasses 1500 that may be used by operators with exemplary embodiments of the disclosed subject matter. In addition to holographic glasses, similar holographic vision devices can be used, for example, but not limited to, holographic goggles and holographic helmets. Specifically, the holographic glasses 1500 shown in FIG. 15 are the HoloLens™ by Microsoft Corporation of Redmond, Wash., which enable the presentation of an augmented reality of the world around the wearer. The holographic glasses 1500 can include one or more cameras that can be used in confirming proper completion of manual actions in real-time as well as the current status of a piece of equipment or process that is the subject of an automated procedure process. In addition, the holographic glasses 1500 can include one or more speakers to receive audio instructions and/or warnings related to the status and completion of the automated procedure in progress.

Figure 16:
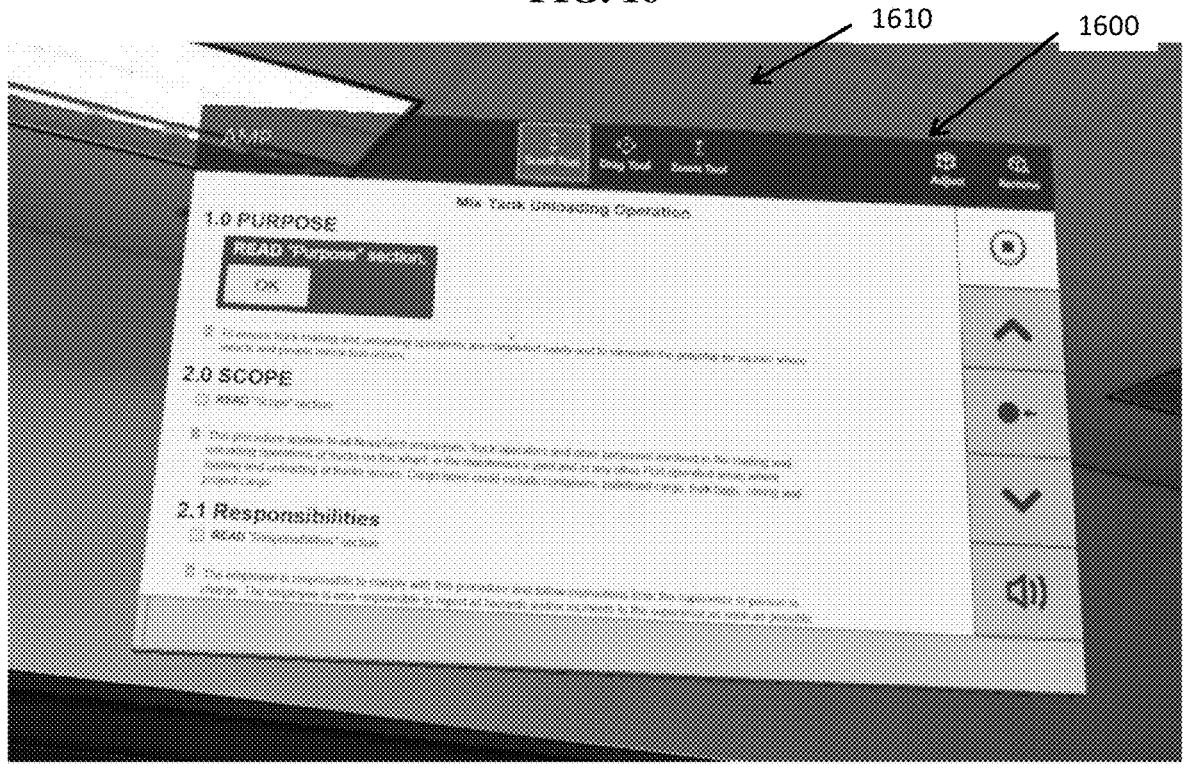
FIG. 16 is an exemplary embodiment of the presently disclosed subject matter of a holographic image of an executing procedure that is being displayed on the holographic glasses of FIG. 15.

FIG. 16 is an exemplary embodiment of a holographic image 1600 of an executing procedure that is being displayed on the holographic glasses 1500 of FIG. 15. In FIG. 16, the holographic image 1600 is displayed over the actual room view 1610 that is visible through the holographic glasses 1500. Because where the holographic image 1600 is displayed can be controlled by the holographic glasses 1500, it is possible to pin the image to a location in the room that does not interfere with the operator's vision and view of the system being monitored. For example, the holographic image 1600 can be pinned so it is fixed and displayed next to the system, but does not overlap the system, so it does not interfere with the operator's view of the system. In addition, although not shown here, it is also possible to have fiducial markers pinned to specific locations over and/or next to the system being monitored. For example, an on/off lever where the lever is in the on position when it is angled to the left and in the closed position when it is angled to the right. By pinning a holographic picture of the correct position of the lever for a currently executing procedure provides an explicit visual indicator to the operator of the correct position of the lever.

Figure 17:
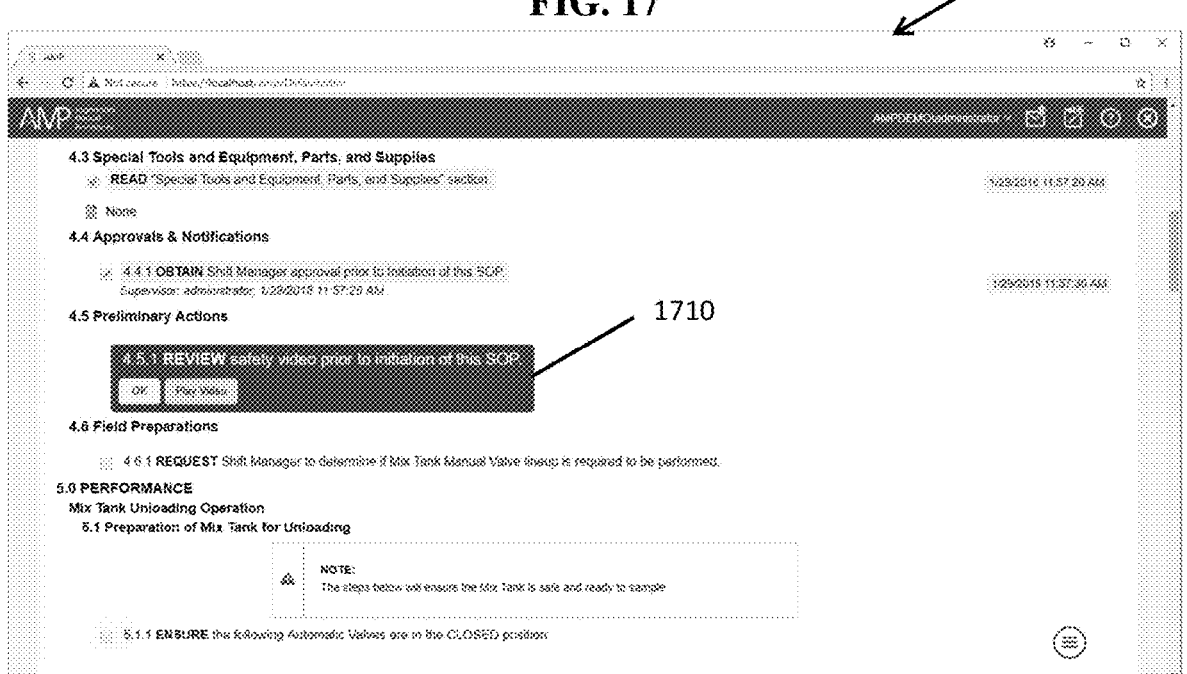
FIG. 17 is an exemplary embodiment of the presently disclosed subject matter of a holographic image of another executing procedure of the presently disclosed subject matter that is being displayed on the holographic glasses of FIG. 15.

FIG. 17 is an exemplary embodiment of a holographic image 1700 of another executing procedure that is being displayed on the holographic glasses 1500 of FIG. 15. In FIG. 17, the holographic image 1700 is displayed over and covers an actual room view that would be visible through the holographic glasses 1500. Procedure step 1710 is about to execute, which involves displaying a safety video.

Figure 18:
FIG. 18 is an exemplary embodiment of the holographic image of FIG. 17 of the another executing procedure of the presently disclosed subject matter with a safety video being displayed over the holographic image.

FIG. 18 is an exemplary embodiment of the holographic image 1700 of FIG. 17 of the another executing procedure with a safety video 1810 being displayed over the holographic image 1700.

Figure 19:
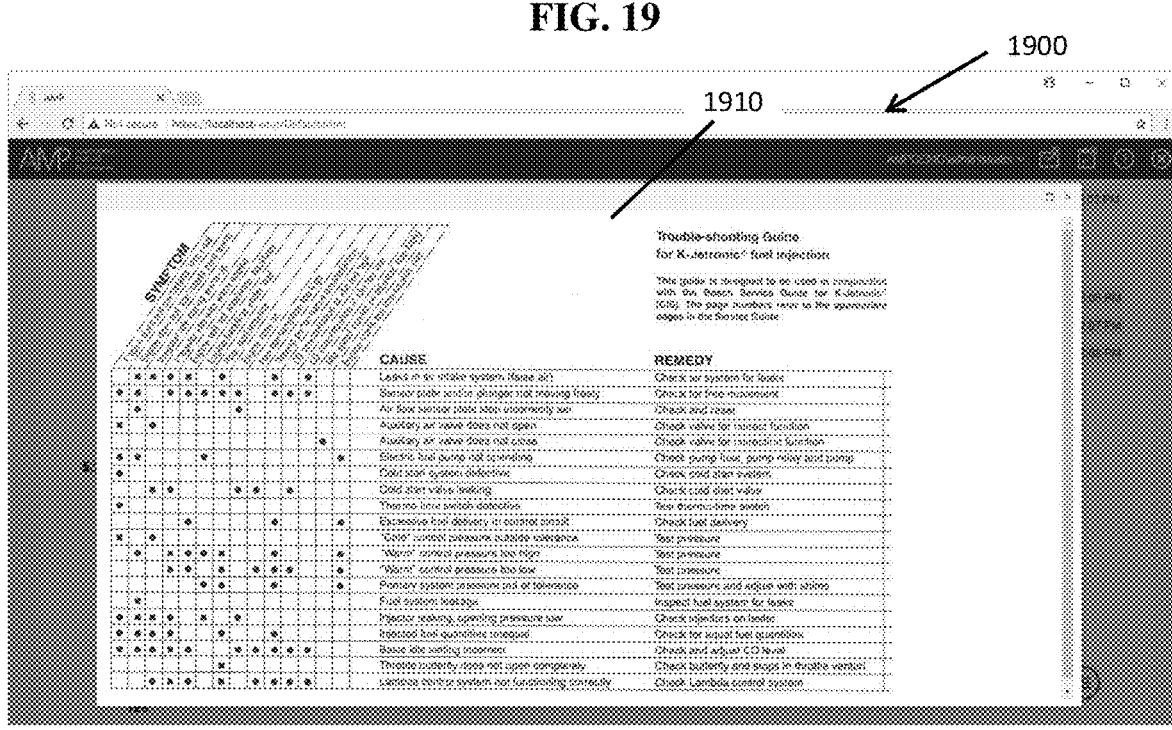
FIG. 19 is an exemplary embodiment of the presently disclosed subject matter of a holographic image of a troubleshooting guide overlay for a fuel-injection system that is being displayed on the holographic glasses of FIG. 15.

FIG. 19 is an exemplary embodiment of a holographic image 1900 of a trouble-shooting guide overlay 1910 for a fuel-injection system that is being displayed on the holographic glasses 1500 of FIG. 15. In FIG. 19, the trouble-shooting guide overlay 1910 is displayed over and covers the holographic image 1700 of FIG. 17.

Figure 20:
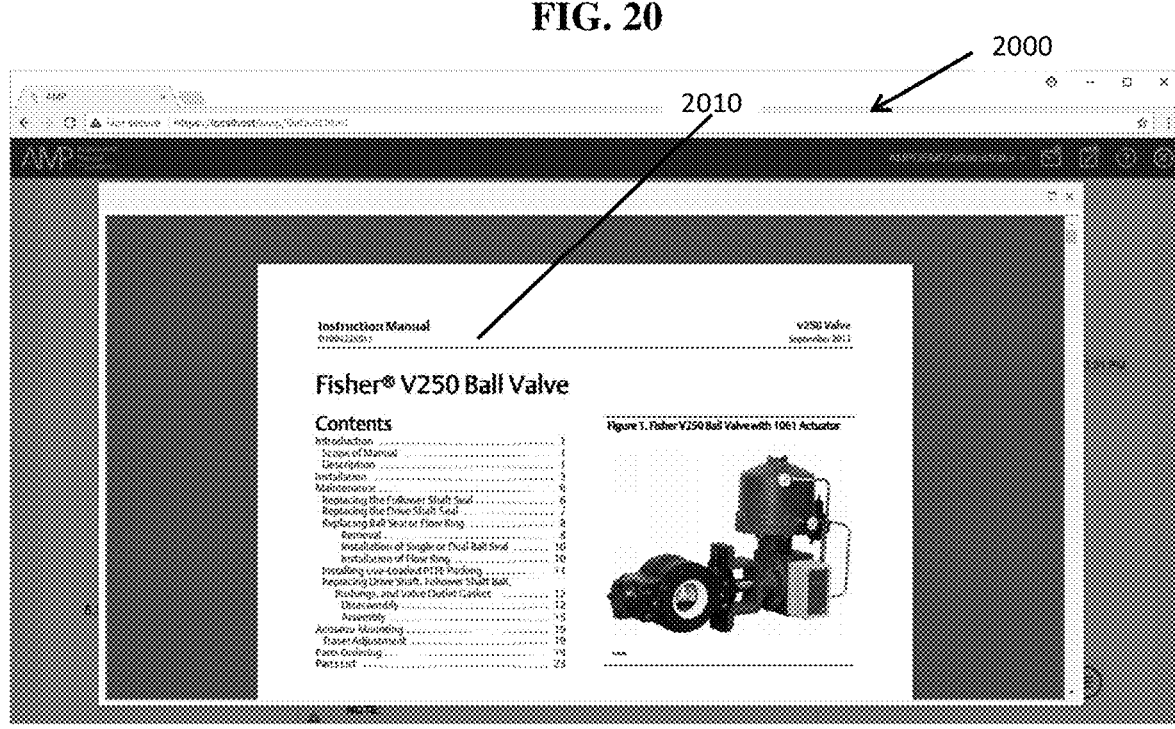
FIG. 20 is an exemplary embodiment of the presently disclosed subject matter of a holographic image of an instruction manual for a ball valve that is being displayed on the holographic glasses of FIG. 15.

FIG. 20 is an exemplary embodiment of a holographic image 2000 of an instruction manual 2010 for a ball valve that is being displayed on the holographic glasses 1500 of FIG. 15. In FIG. 20, the instruction manual 2010 is displayed over and covers the holographic image 1700 of FIG. 17.

One or more exemplary embodiments of the disclosed subject matter can include human factored procedure tools that will "crawl" the procedure and highlight where there are potential pitfalls that could result in human error caused by the procedure user or functionality that will assist in the creation of a highly usable, highly efficient procedure; technical writing support for procedure writers. In addition, one or more exemplary embodiments of the disclosed subject matter can include flexible view outputs (i.e., adaptive procedures), which have the ability to maintain all procedure content in one source document, but can change/alter/vary the view based on the knowledge/skill level of the employee (i.e., new off the street employee sees significantly more information than the veteran employee); view functionality is designed to read the login of who is performing the task and manage the amount of content appropriately. One or more additional exemplary embodiments of the disclosed subject matter can include a procedure update/authoring/integration that can control the transformation of existing procedures into digitized format with minimal effort. For example, an author can tag the word content with "importing" flags, push a button to run a macro script that strips out the formatting from the word document and pulls in the information into the correct section of the procedure at an 80% success rate, then, the author then can simply "clean up" and finalize the procedure. This feature includes an existing procedure import up-loader so the author is not required to create each procedure from scratch.

Other exemplary embodiments of the disclosed subject matter can include rapid procedure development, which are for creating from scratch procedures that start with simplistic questions to help frame the scope and complexity of the task to be done. The author can then click a button and the tool generates a "draft" including common steps at an 80% created rate. The author then can simply modify with the specific details.

Still other exemplary embodiments of the disclosed subject matter can include intuitive procedure authoring, which uses an easy click-and-build or drag-and-drop authoring functionality that allows procedure authors to utilize basic computer skills to create new procedures. Procedure authoring aligns with industry standards for technical writing and does not require any special knowledge of program coding. Also, an emergency "powerless" accessibility to the procedures provides the ability to access necessary procedures 24/7, even in a powerless state (e.g., in hurricane season there can be up to 2 weeks without power).

Still other exemplary embodiments of the disclosed subject matter can include connect-ability between procedure tasks, which is where a procedure prompts the creation of other procedures/forms/permits/records as it is executed; ability for the completion of a procedure to generate additional records by pulling information from specific fields (for example, but not limited to, after a user completes a procedure, it automatically prints off a DOT requirement record to provide to the driver for exit inspection). Yet other exemplary embodiments of the disclosed subject matter can include ease of transitioning from one active procedure to another, which provides logical navigation for the end user on a mobile device.

Still further exemplary embodiments of the disclosed subject matter can include the ability to manage multiple procedures simultaneously and not lose their place by using logical navigation and "flagging" for which procedure matches the active task. This enables the determination of which procedure goes with the instance when multiple procedures of the same name are opened at the same time (for example, but not limited to, an offloading procedure where 4 different spots are all being offloaded and tracked simultaneously).

Yet other exemplary embodiments of the disclosed subject matter can include an in-field procedure update capability, which is the ability for a procedure user to note that a procedure step is incorrect, mark it up, and have a second set of eyes review the markup, then proceed with execution. This uses the ability to communicate changes instantly for approval to proceed and records of the approval captured in the tool. Still other exemplary embodiments of the disclosed subject matter can include a streamlined procedure MOC work flow, which includes a simplification of the MOC process for procedure changes and o shift MOC work flow that meets all MOC requirements.

Other exemplary embodiments of the disclosed subject matter can include just in time communication of change, where the tool is smart enough to read the user login and the procedure revision/updates and prompt the user with a warning box "warning this procedure has changed since you last completed this task. Proceed to review and acknowledge the change before executing the task" or color coding on the search screen that flags the newly published updates for the first 30 or some other predetermined number of days. Still other exemplary embodiments of the disclosed subject matter can include integration/supplement of video training resources to include easy accessibility to link/reference information for on-demand content and the ability to create video procedures with the tool.

Still further exemplary embodiments of the disclosed subject matter can include speech to text capability, which provides the ability for the procedure user to speak what they want to have typed in the text boxes and the procedure then captures the record (like Siri or Alexa). Yet still further exemplary embodiments of the disclosed subject matter can include easy-to-locate and retrieve records of completed procedures with a multifaceted search capability to get the right record for the task performed including the ability to search by title, date, user, among others. Yet still further exemplary embodiments of the disclosed subject matter can include easy-to-complete records retention of no longer needed completed procedures ability to tag a procedure record with a retention time and have a query that can be scanned and mass delete based on retention times.

Yet other exemplary embodiments of the disclosed subject matter can include importing data that is needed by the user using a connection capability to integrate existing data sources with the procedure to "auto-populate" fields in the record (pull from schedule, pull from SAP, etc.). This provides all the information needed by operators to have the control room in their back pocket. Still other exemplary embodiments of the disclosed subject matter can include a source computer dashboard displaying procedures in flight, which provides the ability for activity coordinator/TA/Control Room operator to monitor the completion of procedure in real time. Still other exemplary embodiments of the disclosed subject matter can include easy reporting of procedure use analytics to provide natural reports and a dashboard of options for leadership to pull and analyze.

Still further exemplary embodiments of the disclosed subject matter can include integration with technology for record completion, for example, but not limited to using a camera photo capture into procedure record, barcode scans, RFID reads, etc. This provides one collective record per procedure without having to go back and find the photos/videos with a separate app on a hand-held device. Still other exemplary embodiments of the disclosed subject matter can include computer based training generated for each procedure with automation that combines the procedure step content, the videos, and knowledge/skill check components to teach new users how to perform the task successfully.

Yet other exemplary embodiments of the disclosed subject matter can include corporate wide management of key content with shared steps/content that can be changed in a master location and everywhere that the step is used gets updated automatically, for example, the updates are pushed to the other sites from the master location; maintain a master PPE listing that can be pulled in to procedures so that if we change the approved PPE, it changes for all. Still other exemplary embodiments of the disclosed subject matter can include an information architecture with support from the tool that helps procedure writers analyze the collection of procedures to determine if a generic procedure is more value added than a customized procedure allowing one procedure to exist for the whole business/function. For example, but not limited to; how to run an analytical test on an LC is always the same, what might be input may change, but the actual running of the equipment is the same.

An embodiment of the disclosed subject matter includes a computer-implemented method for managing a process, includes the steps of: (a) method of creating a procedure to manage a process using a graphical user interface and at least one user input device, the method comprising: displaying a flowchart that defines a process in a first dynamic display; displaying a first property indicator in a first of a plurality of property locations in an object definition entry region over the flowchart in the first dynamic display, each location in the object definition entry region operable to receive a property for an object in the flowchart selected using at least one user input device and to receive a function in a second of the plurality of property locations to be performed using the property for the selected object in the flowchart from the at least one user input device; receiving the property for the object in the first of the plurality of property locations and the function selection in the second of the plurality of property locations from the at least one user input device; displaying a scripting entry region in the first dynamic display, the scripting entry region operable to receive at least one script; receiving the at least one script in the scripting entry region from the at least one user input device; displaying a build procedure entry region in the first dynamic display, the build procedure entry region operable to receive at least one instruction to build the procedure to manage the process based on the received property for the object, the function and the at least one script; receiving the at least one instruction and building the procedure to manage the process based on the received at least one property for the object, the function and the at least one script; displaying the built procedure to manage the process in a second dynamic display and storing the built procedure in a secure data format and a computer function language; and receiving user inputs from the at least one user input device to start and run the built procedure to manage the process.

Another embodiment of the disclosed subject matter includes a method of controlling a procedure to manage a process using a graphical user interface and at least one user input device, the method including: (a) receiving a login request to a system with a plurality of available executable procedures using unique user login credentials; (b) displaying a list of approved procedures from the plurality of available procedures in a dynamic display based on the unique user login credentials; (c) receiving a selection of a procedure from the list of approved procedures from the plurality of available procedures from the at least one user input device; (d) generating an execution version of the selected procedure associated with the unique user login credentials; (e) displaying a step-by-step execution of the selected procedure in the dynamic display; (f) receiving an instruction to begin the selected procedure; (g) highlighting a step in the step-by-step execution of the selected procedure that is currently being executed in the dynamic display; (h) displaying an operator response entry region in the dynamic display based on the execution of the selected procedure in response to an input from the process being monitored by the selected procedure, the operator response entry region in the dynamic display being operable to receive operator input; (i) receiving an operator input from the at least one user input device in the operator response entry region in the dynamic display; (j) determining whether the received operator input permits continued execution of the execution version of the selected procedure, if so, then continue execution of the execution version of the selected procedure, if not, wait until the received operator input enables continued execution of the execution version of the selected procedure; (k) storing the received operator input and the input from the process being monitored in the execution version of the selected procedure associated with the unique user login credentials; determining whether there are more steps in the execution version of the selected procedure to execute, if so, then repeat elements d-i, if not, store a final version of the executed version of the selected procedure in a secure data format and inputs in a secure associated with the unique user login credentials; and terminating the execution of the execution version of the selected procedure associated with the unique user login credentials.

Another embodiment of the disclosed subject matter includes a system for executing a computer-implemented method for managing a process, the system includes: A system for controlling a procedure to manage a process using a graphical user interface and at least one user input device, the system includes: a web server coupled to a web client and a mobile client, the web client and the mobile client each enabled to receive and execute a procedure to run a process, the web server including a software designer program and a software manager program, both of which are enabled to be directly accessed by the web client; a database enabled to store the procedure created to run the process for access for execution as well as initial creation and editing, the database is coupled to the web server; a network coupled to the web client, where the network includes one or more communication links and associated network hardware, the web server is used by the web client to access one or more resources of the web server; an OPC access service component is coupled to and in communication with one or more control systems via an OPC connection and the OPC access service component is coupled to and in communication with an OPC server, which in turn is coupled to and in communication with the database; a flowchart procedure writer includes the software designer program and the software manager program; and a service component directly coupled to multiple plant databases and open APIs to exchange data via a communications channel, implemented using Lua created functions.

In yet another exemplary embodiment of the disclosed subject matter, a computer-implemented method for managing a process, includes the steps of: (a) receiving the process by receiving input of visual operation information in a graphical visual procedure interface format, and receiving a free form text description; (b) converting said visual operation information from said graphical visual procedure interface format and said free form text description to a data container language format; and (c) converting data in said data container language format to a computer function language format, sending data in said computer function language format to interpreters for multiple real-time feedback control units, and allowing the interpreters to automatically execute the process represented by the data, and including an alarm response routine with visual operation information, wherein said alarm response routine in the computer function language format is capable of causing interactive display of a step or steps of a procedure in the process in response to an alarm condition and, wherein the multiple real-time feedback control units use information of a physical state of a process or a piece of equipment that the procedure is monitoring; (d) displaying information from data in said data container language format in a procedure overview display; (e) allowing an operator to update said data in said data container language format; (f) delaying the procedure until the operator to update said data in said data container language format is received; (g) allowing an automated action to execute; (h) delaying the procedure until the automated action executes and a response is received, generating an image document in a secure format from said updated data in said data container language format, and electronically filing said image document in a secure format with a regulatory organization.

While the disclosed subject matter has/have been described in conjunction with a number of embodiments, it is evident that many alternatives, modifications and variations would be or are apparent to those of ordinary skill in the applicable arts. Accordingly, Applicant intends to embrace all such alternatives, modifications, equivalents, and variations that are within the spirit and scope of the disclosed subject matter described herein.

What is claimed is:

1. A method of creating a procedure to manage a process using a graphical user interface and at least one user input device, the method comprising:
   displaying a flowchart that defines a process in a first dynamic display;
   displaying a first property indicator in a first of a plurality of property locations in an object definition entry region over the flowchart in the first dynamic display, each location in the object definition entry region operable to receive a property for an object in the flowchart selected using at least one user input device and to receive a function in a second of the plurality of property locations to be performed using the property for the selected object in the flowchart from the at least one user input device;
   receiving the property for the object in the first of the plurality of property locations and the function in the second of the plurality of property locations from the at least one user input device;
   displaying a scripting entry region in the first dynamic display, the scripting entry region operable to receive at least one script;

receiving the at least one script in the scripting entry region from the at least one user input device;

displaying a build procedure entry region in the first dynamic display, the build procedure entry region operable to receive at least one instruction to build the procedure to manage the process based on the received property for the object, the function and the at least one script;

receiving the at least one instruction and building the procedure to manage the process based on the received property for the object, the function and the at least one script;

displaying the built procedure to manage the process in a second dynamic display and storing the built procedure in a secure data format and a computer function language; and receiving user inputs from the at least one user input device to start and run the built procedure to manage the process.

2. The method of claim 1 wherein the secure data format is a pdf format.

3. The method of claim 1 wherein the computer function language is executable by a processor.

4. The method of claim 3 wherein the computer function language when executed by the processor displays the procedure in a screen in a third dynamic display, the displayed procedure is operable to receive inputs from the at least one user input device.

5. The method claim 4 wherein progress of the displayed procedure is controlled by the received inputs from the at least one user input device.

6. The method of claim 5 wherein progress of the displayed procedure can be altered by an external input received from a system that is communicatively connected to the procedure.

7. The method of claim 6 wherein the external input received from the system can include receiving an alarm condition.

8. The method of claim 7 wherein continued progress of the displayed procedure after receiving the alarm condition depends on receiving an input from the at least one user input device.

9. The method of claim 1 wherein the flowchart defines an order of performance of the process including individual steps and determinations of conditions.

10. The method of claim 6 wherein the system is a control system for an industrial system.

11. A method of controlling a procedure to manage a process using a graphical user interface and at least one user input device, the method comprising:

a. receiving a login request to a system with a plurality of available executable procedures using unique user login credentials;

b. displaying a list of approved procedures from the plurality of available executable procedures in a dynamic display based on the unique user login credentials;

c. receiving a selection of a procedure from the list of approved procedures from the plurality of available executable procedures from the at least one user input device;

d. generating an execution version of the selected procedure associated with the unique user login credentials;

e. displaying a step-by-step execution of the selected procedure in the dynamic display;

f. receiving an instruction to begin the selected procedure;

g. highlighting a step in the step-by-step execution of the selected procedure that is currently being executed in the dynamic display;

h. displaying an operator response entry region in the dynamic display based on the step-by-step execution of the selected procedure in response to an input from the process being monitored by the selected procedure, the operator response entry region in the dynamic display being operable to receive operator input;

i. pausing the step-by-step execution of the selected procedure;

j. receiving an operator input from the at least one user input device in the operator response entry region in the dynamic display;

k. determining whether the received operator input permits continued execution of the execution version of the selected procedure, if so, then continue the step-by-step execution of the execution version of the selected procedure, if not, wait until the received operator input enables the continued step-by-step execution of the execution version of the selected procedure;

l. storing the received operator input and the input from the process being monitored in the execution version of the selected procedure associated with the unique user login credentials;

m. determining whether there are more steps in the execution version of the selected procedure to execute, if so, then repeat elements d-i, if not, store a final version of the executed version of the selected procedure in a secure data format and inputs in a secure associated with the unique user login credentials; and n. terminating the execution of the execution version of the selected procedure associated with the unique user login credentials.

12. The method of claim 11 wherein the secure data format is a pdf format.

13. The method of claim 11 further comprising, prior to step 11.e.: displaying a training video for viewing by an operator before beginning the procedure.

14. The method of claim 12 further comprising, prior to step 11.e.: displaying a training video for viewing by an operator before continuing with the procedure.

15. The method of claim 11, wherein the inputs are stored in the secure data format comprise at least one of:

a time stamp indicating completion of each step in the step-by-step execution of the selected procedure;

recorded operator actions;

operator comments;

an action sequence recording; and a picture of a component of the system in a final state.

16. The method of claim 11 further comprising:

in association with the highlighting the step in the step-by-step execution of the selected procedure that is currently being executed in the dynamic display, displaying a fiducial marker over the dynamic display, the fiducial marker containing a desired final position or configuration of a component in the system.

17. The method of claim 16 further comprising:

automatically comparing the displayed fiducial marker to a current image of the component to determine an action to complete the highlighted step and displaying the determined action in the dynamic display.

18. The method of claim 17 further comprising:

automatically performing the determined to complete the highlighted step.

19. The method of claim 17 further comprising:
the operator manually performing the determined action to complete the highlighted step.

20. The method of claim 17, wherein, if the fiducial marker and the current image of the component are determined to match each other, then, no action is needed and the step is marked as completed, but, if the fiducial marker and the current image are determined not to match each other, then, send an instruction to an operator to change the component so its revised current image matches the fiducial marker and mark the step as completed.

21. The method of claim 20, wherein the fiducial marker is displayed on one of a computer screen, a tablet screen, a pda screen, and a wearable augmented reality viewing system.

22. The method of claim 21, wherein the wearable augmented reality viewing system comprises: a pair of holographic glasses.

23. The method of claim 21, wherein the fiducial marker is pinned to a virtual location in an area adjacent to the component and the fiducial marker is only displayed in that virtual location on the computer screen, the tablet screen, the pda screen, or the wearable augmented reality viewing system when the virtual location is in a field of view of the computer screen, the tablet screen, the pda screen, or the wearable augmented reality viewing system.

24. The method of claim 11 further comprising:
o. displaying an automated action required message in the dynamic display based on the step-by-step execution of the selected procedure;
p. sending a request to perform the automated action;
q. pausing the execution of the selected procedure;
r. receiving a response from performing the automated action;
s. continuing execution of the selected procedure based on the response from performing the automated action.

25. A system for controlling a procedure to manage a process using a graphical user interface and at least one user input device, the system comprises:
a web server coupled to a client, the client enabled to receive and execute a procedure to run a process, the web server including a software designer program and a software manager program, both of which are enabled to be directly accessed by the client;
a database enabled to store the procedure created to run the process for access for execution as well as initial creation and editing, the database is coupled to the web server;
a network coupled to the client, where the network includes one or more communication links and associated network hardware, the web server is used by the client to access one or more resources of the web server;
an OPC access service component is coupled to and in communication with one or more control systems via an OPC connection and the OPC access service component is coupled to and in communication with an OPC server, which in turn is coupled to and in communication with the database;
a procedure writer includes the software designer program and the software manager program; and
a service component directly coupled to multiple plant databases and open APIs to exchange data via a communications channel, implemented using Lua created functions.

26. The system of claim 25, wherein the client is a standalone computing device.

27. The system of claim 25, wherein the client is at least one of a web client and a mobile client.

28. The system of claim 25, wherein the system is platform independent.

29. The system of claim 25, wherein the client is a computer.

30. The system of claim 25, wherein the client is a component of a network system.

31. The system of claim 25, wherein the client is part of a client-server system with the web server.

32. The system of claim 25, wherein the network includes a wireless or wired network communication link.

33. The system of claim 25, wherein the database, either directly through the web server or through the web server and a service component, connects to the client and to the mobile client.

34. The system of claim 25, wherein each of the one or more control systems can include a stand-alone control system.

35. The system of claim 25, wherein each of the one or more control systems can include a programmable logic controller (PLC) and a control system.

36. A computer-implemented method for managing a process, comprising the steps of: (a) receiving the process by receiving input of visual operation information in a graphical visual procedure interface format, and receiving a free form text description; (b) converting said visual operation information from said graphical visual procedure interface format and said free form text description to a data container language format; and (c) converting data in said data container language format to a computer function language format, sending the data in said computer function language format to interpreters for multiple real-time feedback control units, and allowing the interpreters to automatically execute the process represented by the data, and including an alarm response routine with visual operation information, wherein said alarm response routine in the computer function language format is capable of causing interactive display of a step or steps of a procedure in the process in response to an alarm condition and, wherein the multiple real-time feedback control units use information of a physical state of the process or a piece of equipment that the procedure is monitoring; (d) displaying information from the data in said data container language format in a procedure overview display; (e) allowing an operator to update said data in said data container language format; (f) delaying the procedure until the updated data in said data container language format is received; (g) allowing an automated action to execute; (h) delaying the procedure until the automated action executes and a response is received, generating an image document in a secure format from said updated data in said data container language format, and electronically filing said image document in a secure format with a regulatory organization.

* * * * *